United States Patent [19]

Keim et al.

[11] Patent Number: 5,785,252

[45] Date of Patent: *Jul. 28, 1998

[54] TWO-COMPONENT SPRAY NOZZLE, IN PARTICULAR FOR A SPRAY ELEMENT OF A SPRAY TOOL OF A DIE SPRAYING DEVICE AND INTERCHANGEABLE NOZZLE ASSEMBLY FOR TWO-COMPONENT SPRAY NOZZLES

[75] Inventors: Karl-Heinz Keim, Neu-Ulm; Rudi Kober, Sussen, both of Germany

[73] Assignee: Acheson Industries, Inc., Port Huron, Mich.

[ * ] Notice: The term of this patent shall not extend beyond the expiration date of Pat. No. 5,524,829.

[21] Appl. No.: 607,902

[22] Filed: Feb. 27, 1996

[30] Foreign Application Priority Data

Mar. 27, 1995 [DE] Germany ............ 195 11 272.5

[51] Int. Cl.$^6$ .................................................. F23D 11/10
[52] U.S. Cl. ...................... 239/418; 239/422; 239/424; 239/601
[58] Field of Search ............................ 239/398, 400, 239/418, 422, 424, 423, 601

[56] References Cited

U.S. PATENT DOCUMENTS

| | | | |
|---|---|---|---|
| 3,421,702 | 1/1969 | O'Brien | 239/418 |
| 3,822,654 | 7/1974 | Ghelfi | 110/7 |
| 3,830,172 | 8/1974 | Hindenlang | 110/7 |
| 4,094,625 | 6/1978 | Wang et al. | 431/9 |
| 4,412,808 | 11/1983 | Sheppard et al. | 239/398 |
| 4,785,746 | 11/1988 | Roy et al. | 239/426 |
| 5,524,829 | 6/1996 | Keim et al. | 239/533.15 |
| 5,603,984 | 2/1997 | Keim et al. | 427/236 |

*Primary Examiner*—Andres Kashnikow
*Assistant Examiner*—Lisa Ann Douglas
*Attorney, Agent, or Firm*—Dinnin & Dunn, P.C.

[57] ABSTRACT

A two-component spray nozzle, in particular for die spraying devices, comprising a nozzle inlet end for working medium and blast air as well as a nozzle outlet and, a blast air guiding portion having at least one blast air supply line connectable with a supply member for blast air, and a working medium guiding portion having at least one working medium supply line connectable with a supply mechanism for the working medium.

33 Claims, 13 Drawing Sheets

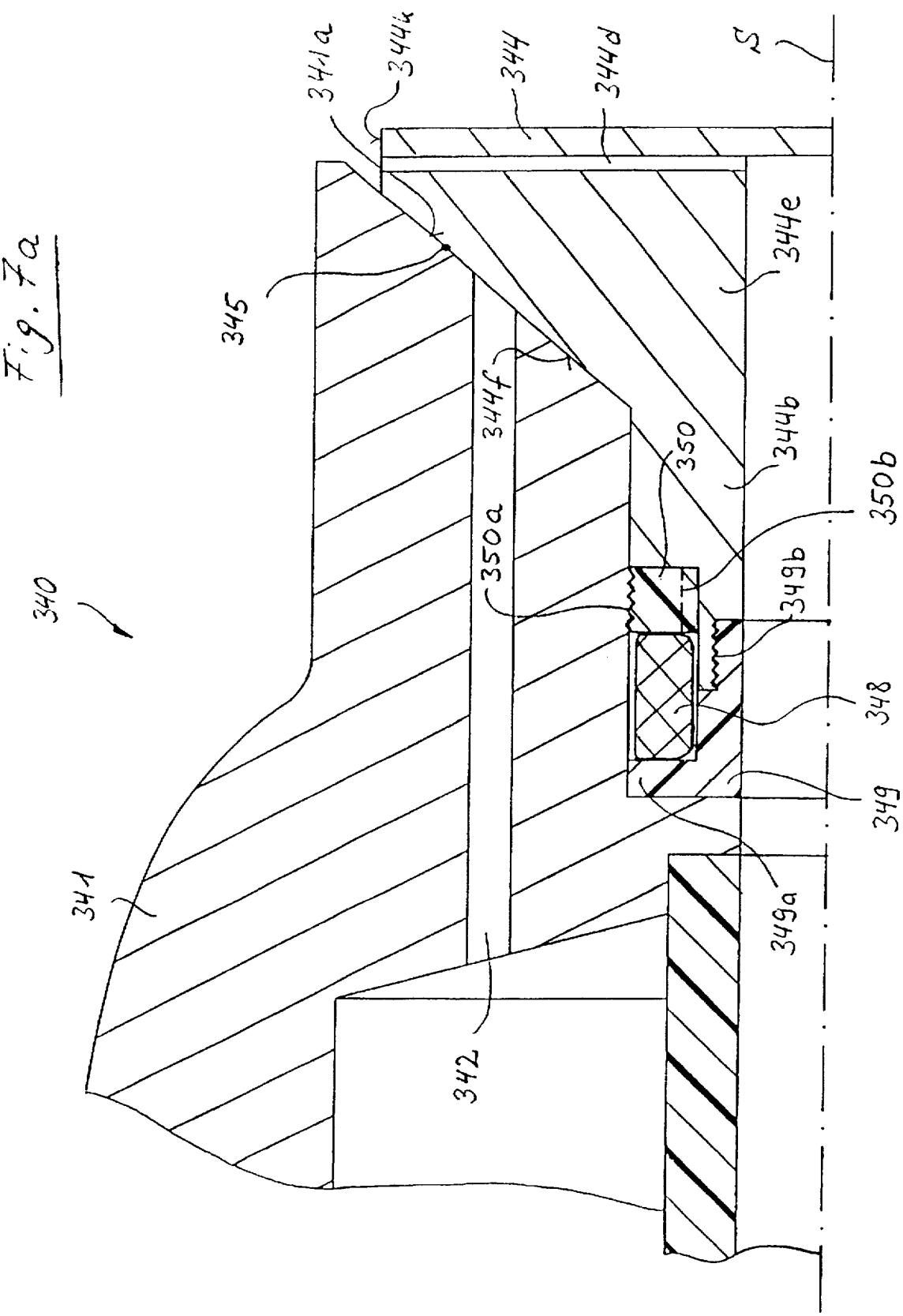

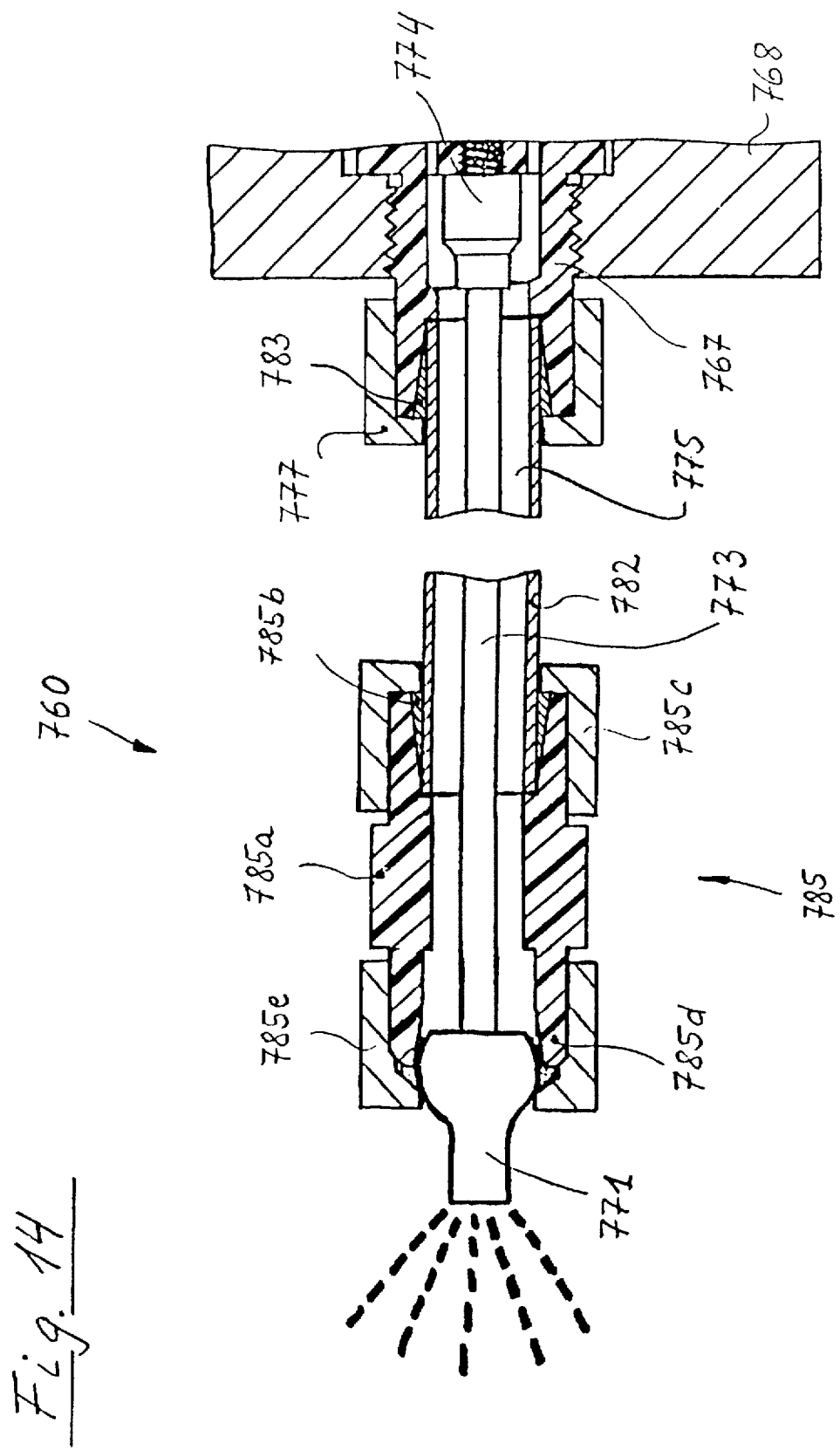

TWO-COMPONENT SPRAY NOZZLE, IN PARTICULAR FOR A SPRAY ELEMENT OF A SPRAY TOOL OF A DIE SPRAYING DEVICE AND INTERCHANGEABLE NOZZLE ASSEMBLY FOR TWO-COMPONENT SPRAY NOZZLES

DESCRIPTION

The invention relates to a two-component spray nozzle, in particular for die spraying devices, comprising:
- a nozzle inlet end for working medium and blast air as well as a nozzle outlet end,
- a blast air guiding portion having at least one blast air supply line connectable with supply means for blast air, and
- a working medium guiding portion having at least one working medium supply line connectable with supply means for working medium.

Such spray nozzles are used in, for example, spray elements of the spray tools of die spraying devices as required in die-casting, drop forging and other manufacturing methods of hot and cold forming in order to prepare the parts of the die after one operation for the following operation. After having opened the die, the spray tool is moved in between the parts of the die for this purpose, which can then be cleared of metal residues, lubricant residues, and other contaminants by means of compressed air, sprayed with lubricant and furthermore cooled with water.

A spray nozzle of the type described at the beginning has for some time been used by applicant with great success. This spray nozzle is described, for example, in DE 44 20 679 A1. However, the known spray element has proven to have too narrow an atomizing cone for particular applications or, in other words, the spraying spot of the die wall area to be sprayed at a predetermined distance, which spraying spot is covered with working medium, is too small. Accordingly, at a spraying distance of approximately 20 cm the size of the spraying spot is only approximately 15 to 30 cm$^2$.

In order to be able to cover a larger surface by spraying with such a small spraying spot, the spray element has to be moved to and fro across this surface several times. This takes time and thus prolongs the operating cycle of the die-casting installation, the drop forging installation or the like.

As opposed to this it is the object of the invention to provide a spray nozzle of the type described at the beginning, which at a comparable spraying distance can cover a larger suface area with working medium and thus allows spraying large surfaces in shorter time.

According to the invention this object is attained in that there is provided at least one blast air channel between the blast air guiding portion and the working medium guiding portion, which blast air channel is subsequent to the at least one blast air supply line and extends from the nozzle inlet end toward the nozzle outlet end at an increasing distance to a spraying axis defined by these two ends and in that the at least one working medium supply line extending in the working medium guiding portion opens into an end portion of the at least one blast air channel. The blast air channel of the spray nozzle according to the invention gives the blast air supplied via the blast air supply line a direction which even by the working medium added in the end portion of this channel is then not substantially changed. Dynamic effects, for example, discontinuity of the stream on the blast air guiding portion and on the working medium guiding portion, fan out the spraying jet and thus result in a spraying image of an overall enlarged surface of 400 cm$^2$ or more.

The spray nozzle according to the invention preferably operates according to the external mixing principle. According to the external mixing principle the working medium will not be atomized before it has emerged from the nozzle. A nozzle operating in accordance with the external mixing principle is characterized in that it generates only little noise. This is due to the fact that in order to atomize a predetermined amount of working medium according to the external mixing principle a smaller blast air pressure value is sufficient for attaining predetermined atomization properties as compared to atomization according to the internal mixing principle. Actually, according to the internal mixing principle a mixing chamber must be provided, from which the blast air emerges at high velocity of flow to atomize the working medium sufficiently and to maintain these atomization properties until after it emerges from the spray nozzle. In contrast to this, according to the external mixing principle the working medium is atomized only after it has emerged from the nozzle which requires less velocity of flow. Since no dynamic pressure has to be overcome, as in the case of the internal mixing principle, the nozzle element may further be designed with larger passage cross sections for blast air. Thus, a considerably lower air pressure value is required for attaining the same blast air throughput at identical atomization, which is beneficial with respect to the generation of noise.

Further, it has to be noted that the fact that no dynamic pressure has to be overcome offers another advantage in that differently equipped spray tools, i.e. spray tools with different numbers of spray elements, will always produce uniform spraying. The internal mixing principle always involves the danger that due to the occurring dynamic pressure spray tools which, for example, are designed for ten spray nozzles in terms of their cross section, when equipped with only one spray nozzle, will not continue spraying because of the dynamic pressure, except the blast air cross section or the blast air pressure was reduced.

In a first alternative embodiment according to the invention it is provided that the working medium guiding portion is fixedly disposed on the blast air guiding portion. In this connection the blast air guiding portion and the working medium guiding portion may be shaped as separate bodies. This allows easy manufacture of the blast air channel by conventional turning or milling work. If appropriate fine tools and appropriate large spray nozzles, respectively, are used it is in principle nevertheless also possible that the blast air guiding portion is integral with the working medium guiding portion.

For example, the working medium guiding portion can be frictionally fitted into the blast air guiding portion, e.g. it may be pressed or alternatively screwed into the blast air guiding portion.

The steering and directing effect, respectively, that the blast air channel has on the blast air emerging from the spray nozzle can be achieved in particular if the blast air channel extends at a constant angle relative to the nozzle axis. This constant angle of the blast air channel can easily be realized in that the blast air channel, on the side of the blast air guiding portion, is at least partially confined by a truncated cone surface area and/or in that, on the side of the working medium guiding portion, the blast air channel is at least partially confined by a truncated cone surface area.

In this regard it is possible that the truncated cone surface areas of the working medium guiding portion and the blast air guiding portion, which truncated cone surface areas confine the blast air channel, enclose different angles with the nozzle axis.

In this regard the angle enclosed by the truncated cone surface area of the working medium guiding portion and the nozzle axis and the angle enclosed by the truncated cone surface area of the blast air guiding portion and the nozzle axis may be adjusted such that the blast air channel has a constant cross sectional area along the path of the blast air. Thereby it can be achieved that the velocity of flow of the blast air in the blast air channel which expands in the form of a funnel will remain substantially constant over the entire length of the blast air channel.

However, it has shown in practice that the influence the velocity of flow of the blast air in the blast air channel has on the spraying result obtained is low, if not completely neglectable. For reasons of facilitating manufacture an embodiment of the invention further suggests that the truncated cone surface areas of the working medium guiding portion and the blast air guiding portion, which truncated cone surface areas confine the blast air channel, together with the nozzle axis enclose the same angle.

It is further suggested that at least one of the truncated cone surface areas of the working medium guiding portion and the blast air guiding portion, which truncated cone surface areas confine the blast air channel, together with the nozzle axis encloses an angle between 40° and 70°, preferably between 45° and 65°. Such spray nozzles achieve large spraying images which are nevertheless substantially homogeneous over the entire diameter. This can be explained as follows. The blast air flow that is discontinued at the working medium guiding portion builds up negative pressure in the region of the front surface of the working medium guiding portion. A part of the spraying jet which initially emerges in the form of a conical envelope surface is contracted toward the nozzle axis due to this negative pressure. The form of the spraying spot which owing to the conical envelope surface is expected to be annular is thereby blurred to result in a full circle. On the side of the blast air guiding portion the negative pressure that is built up due to the discontinuity of the blast air flow will always be compensated by ambient pressure. Thus the spraying jet is not fanned out and can thus extend substantially in the direction determined by the blast air channel substantially without interference. The negative pressure building up in the region of the front surface of the working medium guiding portion cannot be compensated by ambient pressure.

If the angle of the blast air channel is chosen to be less than 40°, the negative pressure building up in the region of the front face of the working medium guiding portion will be so high that the spraying jet "collapses" toward the nozzle axis, thus resulting in a spraying image differing only marginally from the spraying images of prior art. However, if the angle of the blast air channel is chosen to be greater than 70°, the negative pressure in the region of the front face will not be sufficient for deflecting the emerging jet of spraying agent toward the nozzle axis. The spraying image obtained may be large in surface but annular.

In order to be able to ensure reproducibility of spray elements having identical spraying properties by way of simple manufacturing technology it is suggested that the working medium guiding portion and the blast air guiding portion have seat faces designed for mutual abutment with one another, the working medium guiding portion or/and the blast air guiding portion being provided with a step section between the respective seat face and a respective blast air channel confining surface. The step section and in particular the height of the step section is a variable that can easily be controlled in manufacturing technology and can thus be reliably reproduced.

It is preferred that the end portion of the blast air channel be expanded to form an atomizing chamber. Although such an atomizing chamber may be dispensed with in principle, it is then inevitable that backpressure builds up in the working medium supply line. This backpressure would have disadvantageous negative effects on the function and in particular with respect to the generation of noise of the entire spray element, especially because such backpressure would have to be compensated by means of an increased pressure of working medium so that the spray element achieves the same spraying performance. Thus, it is preferred to provide an atomizing chamber in the region of the working medium outlet, which chamber will prevent that such backpressure is built up.

In a further embodiment of this atomizing chamber it is provided that on the side of the working medium guiding portion the atomizing chamber is confined by a surface extending substantially parallel to the nozzle axis and also by a truncated cone surface area on the side of the blast air guiding portion. In this embodiment the spraying jet flow will first discontinue on the side of the working medium guiding portion so that the aforementioned negative pressure can build up in the region of the front surface of this portion. On the side of the blast air guiding portion the spraying jet is meanwhile still safely guided by the truncated cone surface area so that it is possible to obtain a spraying image having a substantially well defined edge.

In an interesting embodiment of the invention it is provided that on the side of the working medium guiding portion and on the side of the blast air guiding portion the blast air channel is confined by an annular face extending substantially orthogonally to the nozzle axis and that, if desired, an atomizing chamber is provided in the end portion of the blast air channel, which atomizing chamber is confined by a truncated cone surface area on the side of the working medium guiding portion and by the annular face on the side of the blast air guiding portion. This embodiment is particularly suited for spraying inside peripheral faces of hollow bodies, for example pipes, since they afford a large-surface annular spraying image. While conventional spray elements have so far required a whole crown of spray nozzles for spraying the inside wall of a pipe, in accordance with the emodiment of the spray element of the invention described above one single spray nozzle like this is sufficient. It is now possible to spray the inside wall faces of small diameter pipes as well.

It has to be noted that in order to achieve comparable spraying results it is also possible to employ truncated cone surface areas which are inclined in one of the two directions, namely the reverse jet direction or the forward jet direction, relatively to the annular face that was described above and that extends orthogonally to the nozzle axis.

A comparable spraying result can further be achieved in that at the nozzle outlet end of the working medium guiding portion an impact element is arranged, in particular an impact plate, which extends substantially orthogonally to the nozzle axis. To achieve various spraying jet characteristics it is suggested that a face of the impact element, which face is adjacent to the opening for the working medium, together with the nozzle axis encloses a right angle or/and encloses an acute angle with the orthogonal to the nozzle axis.

In order to ensure sufficient guidance of the spraying jet through the impact element it is suggested that the impact element—at least in it extension orthogonal to the nozzle direction—has at least the same dimension as the blast air guiding portion.

Preferably the impact element is integral with the working medium guiding portion.

In order to enable distribution of the working medium over the entire circumference of the nozzle device it is suggested that the working medium supply line comprises a central working medium main channel originating from the nozzle inlet end, which working medium main channel branches into a plurality of working medium branch channels opening into the blast air channel. Here, the working medium branch channels may extend substantially orthogonally to the nozzle axis in order to facilitate their formation in the working medium guiding portion.

To obtain a spraying image which is homogeneous over the circumference it is suggested that the working medium branch channels are uniformly distributed over the circumference of the working medium guiding portion. In particular applications it may also be desired that the working medium guiding portion has circumferential sections with an increased or/and reduced density of working medium branch channels.

Last but not least it is further suggested that the two most recently mentioned embodiments by means of which intentionally inhomogeneous spraying images may be obtained, but not exclusively those, are further provided with means for maintaining the relative orientation of the working medium guiding portion and the blast air guiding portion. This allows greater operational safety of the spray nozzle.

In a second alternative embodiment it is provided that the working medium guiding portion is movably arranged on the blast air guiding portion. This second alternative embodiment can be employed in various ways. For example, due to relative movability of the working medium guiding portion and the blast air guiding portion the cross-sectional area of the blast air channel can be adjusted on demand. This second alternative embodiment also offers operation of the spray nozzle in the mode of a "flutter valve". Both possibilites will be explained in greater detail in the following.

In order to be able to provide for a defined starting condition, on the basis of which a respective desired relative position of the working medium guiding portion and the blast air guiding portion can be adjusted, it is suggested that the working medium guiding portion is flexibly biassed into a neutral position relative to the blast air guiding portion by means of a rubber buffer element or by means of a helical spring, preferably by means of a helical compression spring.

The relative position of the working medium guiding portion and the blast air guiding portion is preferably not uncontrolled. It is rather suggested that the movement of the working medium guiding portion relative to the blast air guiding portion is controlled by use of an externally influenceable control force.

For example, this control force may consist of fluidic pressure force, e.g. pneumatic force generated by blast air pressure, hydraulic force generated by working agent pressure, fluidic pressure force generated by separate control medium or the like. This option may for example be used in order to realize a "flutter valve" spray nozzle.

For example, a flutter valve spray nozzle may be designed and operated as follows: Under the action of pneumatic force generated by the blast air entering into the blast air channel from the blast air lines the working medium guiding portion is separated from the blast air guiding portion opposite to the flexible biassing force in the sense of an enlargement of the cross-sectional area of the blast air channel. Since at certain blast air pressure values the lifting action does not approximate the two parts to a position of equilibrium in the form of a quasi-stationary process but rather takes them beyond such position of equilibrium in the form of a dynamic process, the restoring force of the flexible bias will finally prevail so that in the end the working medium guiding portion is again approximated to its neutral position beyond the position of equilibrium. As a consequence the working medium guiding portion performs a periodic movement around the position of equilibrium: The spray nozzle, or to be more precise the working medium guiding portion of the spray nozzle flutters. Accordingly, the amount of working medium that is dispensed is varied periodically.

The resultant intermittent spraying has advantages in terms of film formation on the die wall. Since the working medium does not hit the hot die wall as a continuous spraying jet, the tendency of the spraying agent to run off the die wall as a result of too intense coverage of the die wall decreases. Moreover, intermittent spraying involves the advantage that the nozzle device tends to be less liable to clogging. Even a self-cleaning effect could be observed. Cyclic relative movement between the working medium guiding portion and the blast air guiding portion may actually cause the working medium, that has probably accrued at the exit of the blast air lines, to be stripped off mechanically or shaped off due to the "fluttering motion".

Intermittent spraying so far could have been attained only by proper driving of the switch valves for working medium and/or blast air. However, the reaction times of such switch valves, even if rapid valve types are used, amount to at least about 0.1 to 0.2 seconds. Using the flutter valve spray nozzles according to the invention as described above, it is however possible to realize much shorter reaction times and thus intermittent spraying at higher frequencies.

If the values for blast air pressure are high the spray nozzle will turn from the periodic oscillation condition to a condition of equilibrium wherein the cross-sectional area of the blast air channel depends on the respective blast air pressure value and is constant in time. In this operating range the spraying jet properties may be spefically influenced by varying the fluidic pressure force, i.e. blast air pressure force in the case of the foregoing example.

The influence on the movement of the working medium guiding portion relative to the blast air guiding portion can also be brought about by generating the control force, for example, by means of an electromagnetic actuator. In this connection it is possible, for example, that the winding of an electromagnet is arranged in the working medium guiding portion or in the blast air guiding portion, preferably in the blast air guiding portion, while the respective other portion, preferably the working medium guiding portion, is at least partially designed as the armature element of the electromagnet. Thereby the control force generated by the actuator, for example, can counteract a flexible biassing force and act in the same direction as the blast air pressure force. However, it is also possible that the control force counteracts the blast air pressure force and alternately with it determines the position of the working medium guiding portion relative to the blast air guiding portion.

To be able to positively ensure that the spray device starts fluttering it is suggested that in the neutral position of the working medium guiding portion relative to the blast air guiding portion the blast air channel has a substantially impercetible cross-sectional area. In fact, the greater the cross-sectional area of the blast air channel in the neutral position of the working medium guiding portion, the sooner the nozzle device is transferred from the fluttering condition to the condition of equilibrium.

In all variants of embodiments of the invention explained above the spray nozzle may be designed to be pivotably mounted on a higher ranking structure, for example a spray element of a spray tool. In principle the spray nozzle may nevertheless also be designed for directionally fixed mounting.

Furthermore the invention relates to a spray element for a spray tool, in particular a die spraying device which is equipped with at least one spray nozzle according to the invention.

In the following the invention is described in greater detail by means of embodiments with reference to the attached drawings.

FIGS. 7a and 7b depict two operating positions of a fourth embodiment of a spray nozzle according to the invention in views analogous to FIG. 4;

FIG. 14 shows a spray nozzle device including fastening member, extension unit, adapter unit and pivotable nozzle tip.

Figure 1:
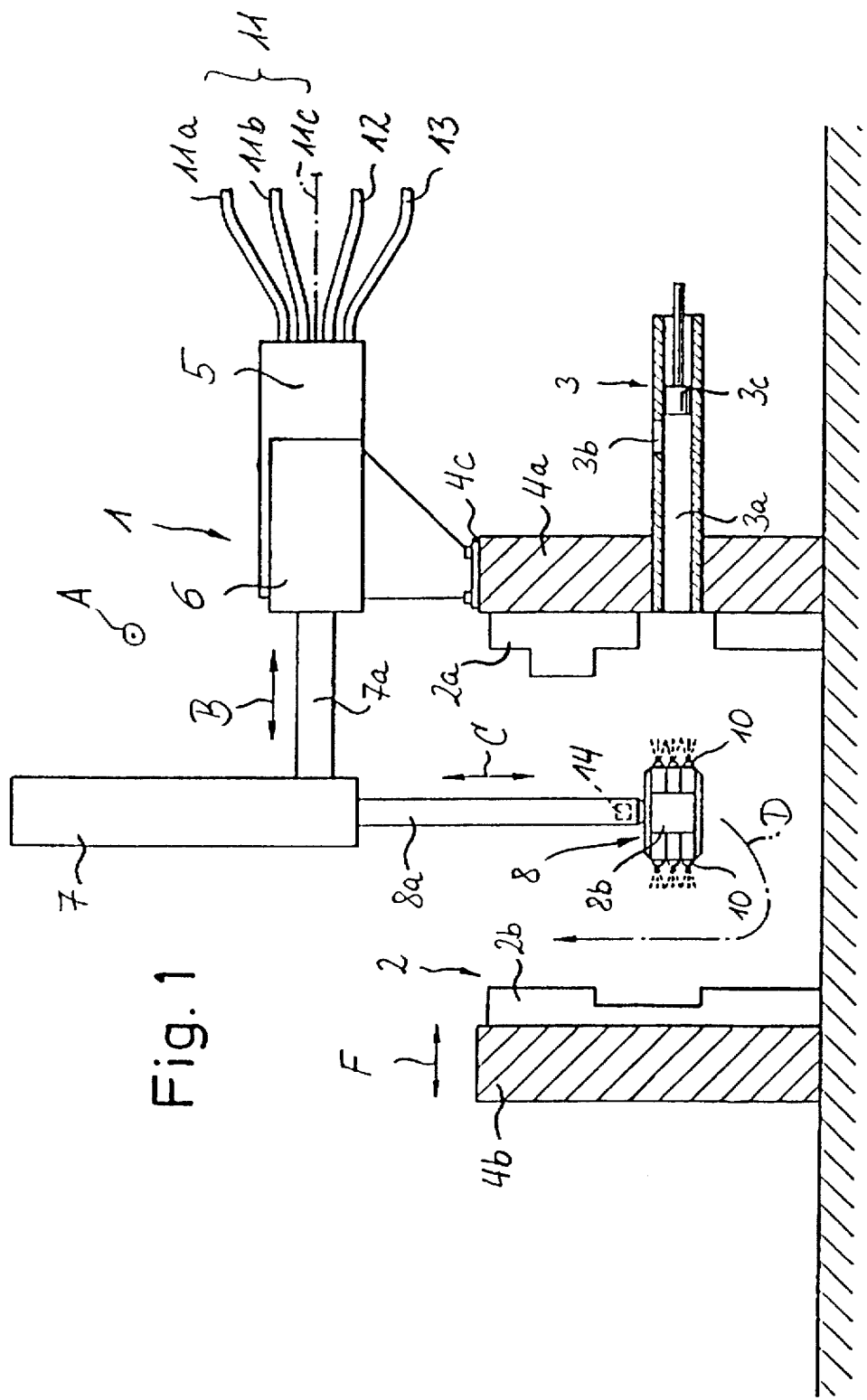
FIG. 1 is a schematic view of a die spraying device in the spray tool of which the spray nozzle according to the invention may be used.

FIG. 1 shows a schematic diagram of a die spraying device referred to as 1 in the following, which can be used, for example, to prepare die parts 2a and 2b of a die 2 for the next operation in the manufacture of components by means of a die-casting process, e.g. the aluminum die-casting process.

In a die-casting process such as this a filling chamber 3a of a filling device 3 is filled through fill opening 3b with liquid metal to be processed. Afterwards the metal is forced into the die 2 by means of a pressing piston 3c. After curing of the component thus manufactured it is removed from the die. To this end the die parts 2a, 2b of the die 2 are mounted on a stationary clamping plate 4a and a movable clamping plate 4b. To open and close the die 2 the movable clamping plate may 4b be displaced in the direction of double arrow F. Although only two clamping plates 4a and 4b having two die parts 2a, 2b are depicted in FIG. 1 it is of course conceivable that also multipart dies having a corresponding number of clamping plates are used.

The die spraying device 1 comprises a first travel unit 5 which is fixed on an upper edge 4c of the stationary clamping plate 4a. A second travel unit 6 is connected with the first travel unit 5, which second travel unit 6 can be relocated relatively to the first travel unit 5 orthogonally to the plane of the drawing in FIG. 1 (direction A). Then again a third travel unit 7 is connected with the second travel unit 6, which third travel unit 7 can be moved horizontally back and forth relative to the second travel unit 6 in the direction of double arrow B by means of an arm 7a guided in the second travel unit 6 and actuated by a drive (not shown). In an analogous manner a spray tool 8 which has a plurality of spray elements 10 can be moved vertically up and down relative to the third travel unit 7 in the direction of double arrow C by means of an arm 8a guided in the third travel unit 7 and actuated by a drive (also not shown).

The first travel unit 5 is connected with feeding lines 11 for liquid working medium, with a feeding line 12 for working air or blast air and with a feeding line 13 for control air. These feeding lines 11, 12, 13 are guided from the first travel unit 5 to the spray tool 8. For the sake of simplified illustration, however, only those sections of these lines are shown which lead to the first travel unit 5.

The feeding lines 11 for working medium comprise a feeding line 11a for water and a feeding line 11b for lubricant. However, it is also possible to provide additional feeding lines 11 for working medium for example for a second sort of lubricant or the like, as indicated in FIG. 1 by dot-dash line 11c. A valve device 14 is provided in spray tool 8 or immediately in front of it, respectively, in order to allow for switching between the different feeding lines 11a, 11b etc. for working medium.

In order to prepare the die 2 for the next operation the spray tool 8 is moved in between the two die parts 2a, 2b by means of the arms 7a and 8a after the die 2 has been opened and the component manufactured has been removed. Subsequently the die parts 2a, 2b are cleared of metal residues, lubricant residues and other contaminants, for example, by means of blast air, cooled by spraying of water, sprayed with lubricant to prepare them for the next operation and, if desired, dried by means of blast air. Thereby the spray tool 8 is moved in the die 2 along a path D chosen in dependence on the topography of die parts 2a, 2b.

Figure 2:
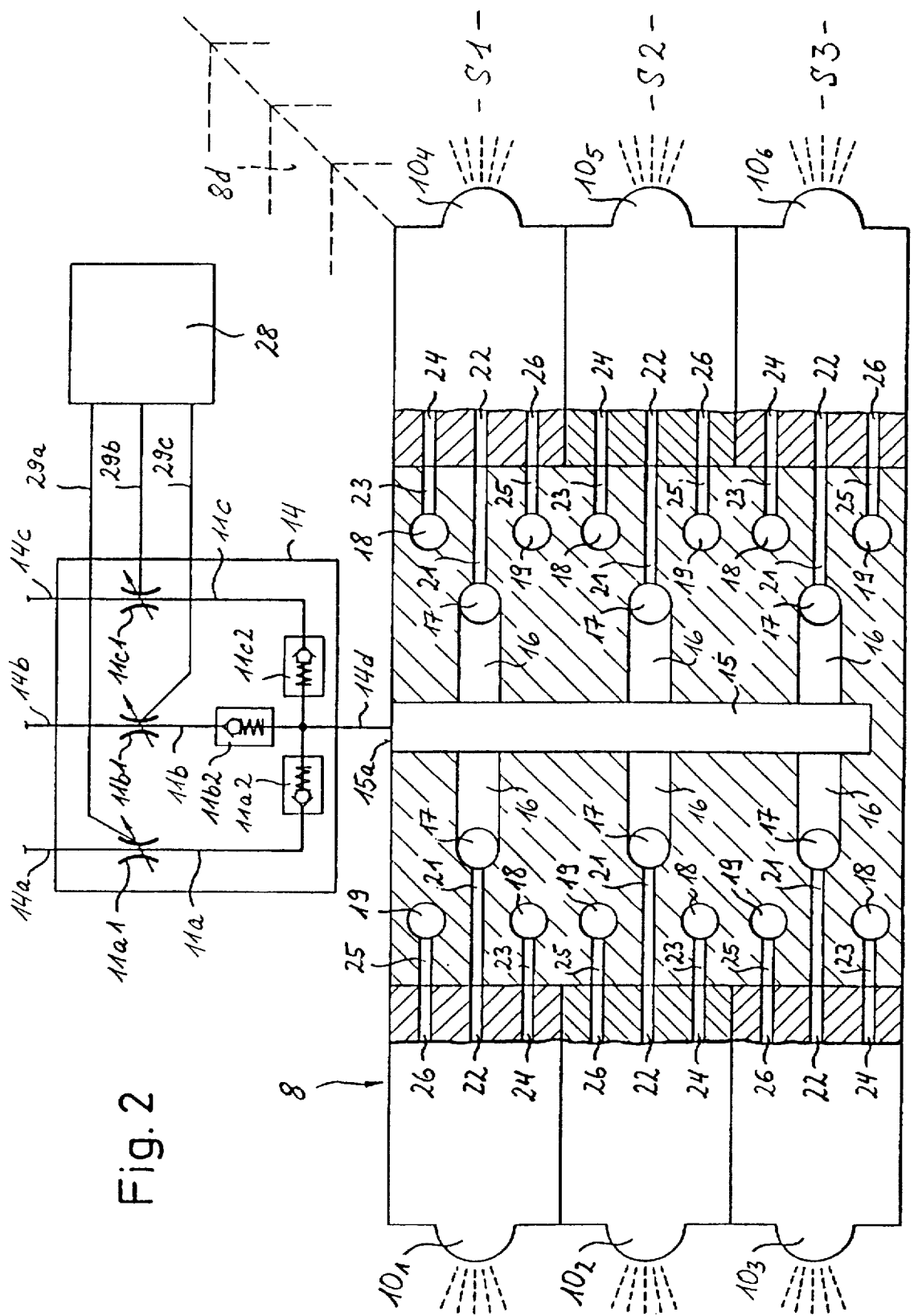
FIG. 2 is a schematic view of a spray tool.

FIG. 2 shows the structure of spray tool 8 in detail. In the present example six spray elements 10 are installed on each spray tool plane 8d at the spray tool 8. The number and orientation of spray elements can be varied as desired, depending on each individual application.

A main working medium line 15 is provided in spray tool 8, from which main working medium line secondary lines branch off which extend across the plane of the drawing in FIG. 2. From these secondary lines 16 then again dunction working medium lines 17 branch off which penetrate the spray tool orthogonally to the plane of the drawing in FIG. 2. Further, junction lines 18 for blast air and working air, respectively, and 19 for control air are provided in spray tool 8, which junction lines extend orthogonally to the plane of the drawing. These junction lines 18 and 19, respectively, are connected with corresponding (not shown) main and secondary lines for working air and control air, respectively, which are designed corresponding to lines 15 and 16. The open ends of junction lines 17, 18 and 19 are sealed by cover plates 8b (see FIG. 1).

The spray elements 10 can be associated to a plurality of control circuits. Accordingly, in FIG. 2, for example, spray elements $10_1$ and $10_4$ are combined to form a control circuit S1, spray elements $10_2$ and $10_5$ are combined to form a control circuit S2 and spray elements $10_3$ and $10_6$ are combined to form a control circuit S3.

This association may easily be attained in that the junction lines 19 for control air associated with spray elements $10_1$ and 10₄ of control circuit S1, spray elements 10₂ and 10₅ of control circuit S2 and spray elements 10₃ and 10₆ of control circuit S3 are connected with a separate main line for control air each, while the control air main lines of the individual control circuits can be supplied with control air independently of one another, for example by means of a valve device (not shown).

From junction lines 17 for working medium supply bores 21 lead to corresponding supply lines 22 for working medium of spray elements 10, from junction lines 18 for working air supply bores 23 lead to corresponding supply lines 24 for working air of spray elements 10, and from junction lines 19 for control air supply bores 25 lead to corresponding supply lines 26 for control air of spray elements 10.

The inlet opening 15a of the main line 15 for working medium shown in FIG. 2 is connected with an outlet line 14d of valve device 14. Feeding lines 11a, 11b and 11c, respectively, are connected with inlet lines 14a, 14b and 14c of valve device 14. In inlet lines 14a, 14b and 14c each a flow rate control valve 11a1, 11b1 and 11c1, respectively, and a check valve 11a2, 11b2 and 11c2, respectively, is arranged.

The passage opening of control valves 11a1, 11b1 and 11c1 can be adjusted independently of one another by means of a control unit 28 via control lines 29a, 29b, 29c. Accordingly, if for example valve 11a1 is opened and valves 11b1 and 11c1 are closed only water can be supplied as working medium, if valve 11b1 is opened and valves 11a1 and 11c1 are closed only lubricant can be supplied as working medium, or if valves 11a1 and 11b1 are opened appropriately and valve 11c1 is closed, a lubricant mixture in a desired mixing ratio can be supplied as working medium. In this regard wide variations in amounts dispensed, viscosities or the like of the working media to be mixed can be taken into consideration by the control unit 28, for example by way of the respective degree to which valves 11a1, 11b1 and 11c1 are opened.

Figure 3:
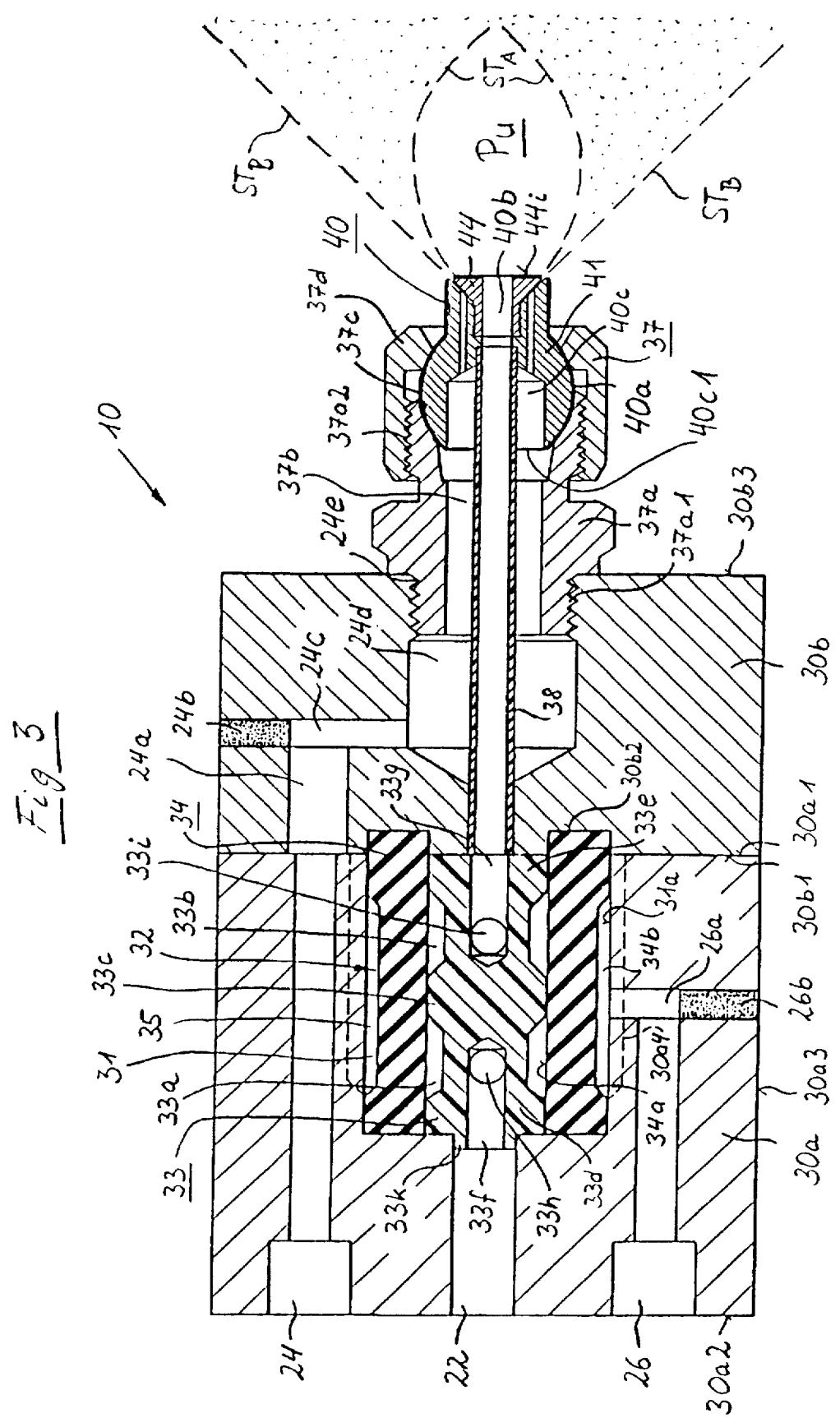
FIG. 3 is an overall view of a spray element equipped with a first embodiment of a spray nozzle according to the invention.

In FIG. 3 a first embodiment of the spray element 10 according to the invention is depicted. Spray element 10 comprises a first housing member 30a and a second housing member 30b which are preferably manufactured as injection-molded parts, with surfaces 30a1 and 30b1 resting against each other and being screwed together by bolt connection means (not shown). In the first housing member 30a the supply lines 22 for liquid working medium, 24 for working air and 26 for control air are provided.

The supply line 22 for working medium runs from a surface 30a2 facing away from surface 30a1 in the direction toward surface 30a1 and opens into a recess 31 with circular cross-section, which recess is open toward surface 30a1. Recess 31 is intended to take up a metering valve 32 the structure of which will be described in detail further below. The supply line 24 for working air connects the two surfaces 30a1 and 30a1 with one another and the supply line 26 for control air, which also extends from the surface 30a2, opens into a transverse bore 26a which connects an outside peripheral surface 30a3 of the spray element with an inside peripheral surface 31a of the recess 31. The outer end of the transverse bore 26a is sealed tightly by a plug 26b.

As described above, in the ready-to-operate state of spray element 10 a metering valve 32 is arranged in the recess 31 of the first housing member 30a, which metering valve comprises a valve seat element 33 and a valve body 34. Both the valve seat element 33 and the valve body 34 are designed essentially cylindrically symmetric.

The valve seat element 33 has two annular recesses 33a and 33b at its outside peripheral surface, which annular recesses are separated by an annular projection 33c forming a valve seat and confined by two further annular projections 33d and 33e. The annular projections 33c, 33d and 33e show essentially identical outside diameters. Pocket holes 33f and 33g emerge from the axial end surfaces of the valve seat element 33, the pocket ends of which communicate with the annular recesses 33a and 33b through transverse bores 33h and 33i. To center the valve seat element 33 in the recess 31 it engages with a tubular shoulder 33k into the supply line 22 for working medium. The axial length of the valve seat element 33 is dimensioned such that in the ready-to-operate state of spray element 10 it is essentially flush with surface 30b1. The valve seat element 33 is preferably manufactured as an injection-molded part.

The valve body 34 is tubular in design and surrounds the valve seat element 33. For this purpose an inside diameter of its passage 34a is substantially identical with, and slightly smaller, respectively, than the outside diameter of annular projections 33c, 33d and 33e of the valve seat element 33. On the outside periphery of valve body 34 an annular recess 34b is formed, which together with the inside peripheral surface 31a of recess 31 defines a chamber 35 which makes it possible to lift the valve body 34 off the valve seat 33c. The outside diameter of the valve body 34 is essentially the same as the inside diameter of recess 31.

Alternatively, the chamber 35 might also be formed by an undercut 30a4 indicated as a broken line in FIG. 3. In this case the annular recess 34b on the outside periphery of valve body 34 could be dispensed with.

In the ready-to-operate state of spray element 10 the valve body 34 projects beyond surface 30a1 and engages in an annular groove 30b2 formed in the second housing member 30b, which annular groove serves to center the metering valve 32. The supply line 24 for blast air continues in the second housing member 30b in a line 24a, which opens into a chamber 24d through a transverse bore 24c that is tightly sealed by a plug 24b at its outer end. The chamber 24d opens at a surface 30b3 of the second housing member 30b, which surface faces away from surface 30b1. A nozzle assembly 37 is accomodated in this opening 24e.

The nozzle assembly 37 comprises a tubular main part 37a at one end of which an externally threaded section 37a1 is provided. The main part 37a is screwed into the opening 24e of the second housing member 30b by means of an externally threaded section 37a1. At its other end the main part 37a is provided with an externally threaded section 37a2. In the region this externally threaded section 37a2 an inside space 37b of the main part 37a is provided with an essentially spherical inside surface 37c. A ball joint 40a of a nozzle element rests against this inside surface 37c, which ball joint is held in position by a cap nut 37d screwed onto the externally threaded section 37a2. A tubular section 38 connected to the pocket hole 33g of the valve seat element penetrates the chamber 24d and the inside space 37b of the main part 37a and opens into a supply line 40b for working medium of the nozzle element 40.

The structure and function of the nozzle element 40 will be explained in detail with reference to FIGS. 4 to 11 further below. Before the function of the spray element 10 will be explained with reference to FIG. 3.

The metering valve 32 of the spray element 10 is a valve that can be opened and closed by the alternate action of working medium pressure and control air pressure. FIG. 3 depicts the metering valve 32 in its normal state, i.e. its closed state. In this state the inside peripheral surface of the valve body 34 rests against the valve seat 33c and thus prevents that working medium is supplied from line 22 through the pocket hole 33f and the transverse bore 33h, from the annular recess 33a, into the annular recess 33b by passing through the valve seat 33c and the valve body 34, and continuing through the transverse bore 33i, the pocket hole 33g and the tubular section 38 into the inside space 37b of the nozzle assembly 37.

If, however, the control air pressure prevailing in line 26 for control air is lowered to assume a value which makes it possible for the pressure of working medium prevailing in line 22 to lift the valve body 34 off the valve seat 33c, valve 32 opens and allows the passage of working medium between the valve seat 33c and the valve body 34. Depending on the control air pressure applied and on the pressure of working medium the opening cross section of the valve 32 can be varied so that valve 32 can be operated as a metering valve for working medium.

The valve body 34 is made of an elastic material, e.g. rubber, and is manufactured with an inherent bias, by which it is biassed into the closed position, i.e. into the position in which it prevents passage of working medium between the valve seat 33c and the valve body 34 so that subsequent leakage, i.e. unintentional discharge, of working medium can reliably be prevented when the spray element 10 is put out of operation.

Figure 4:
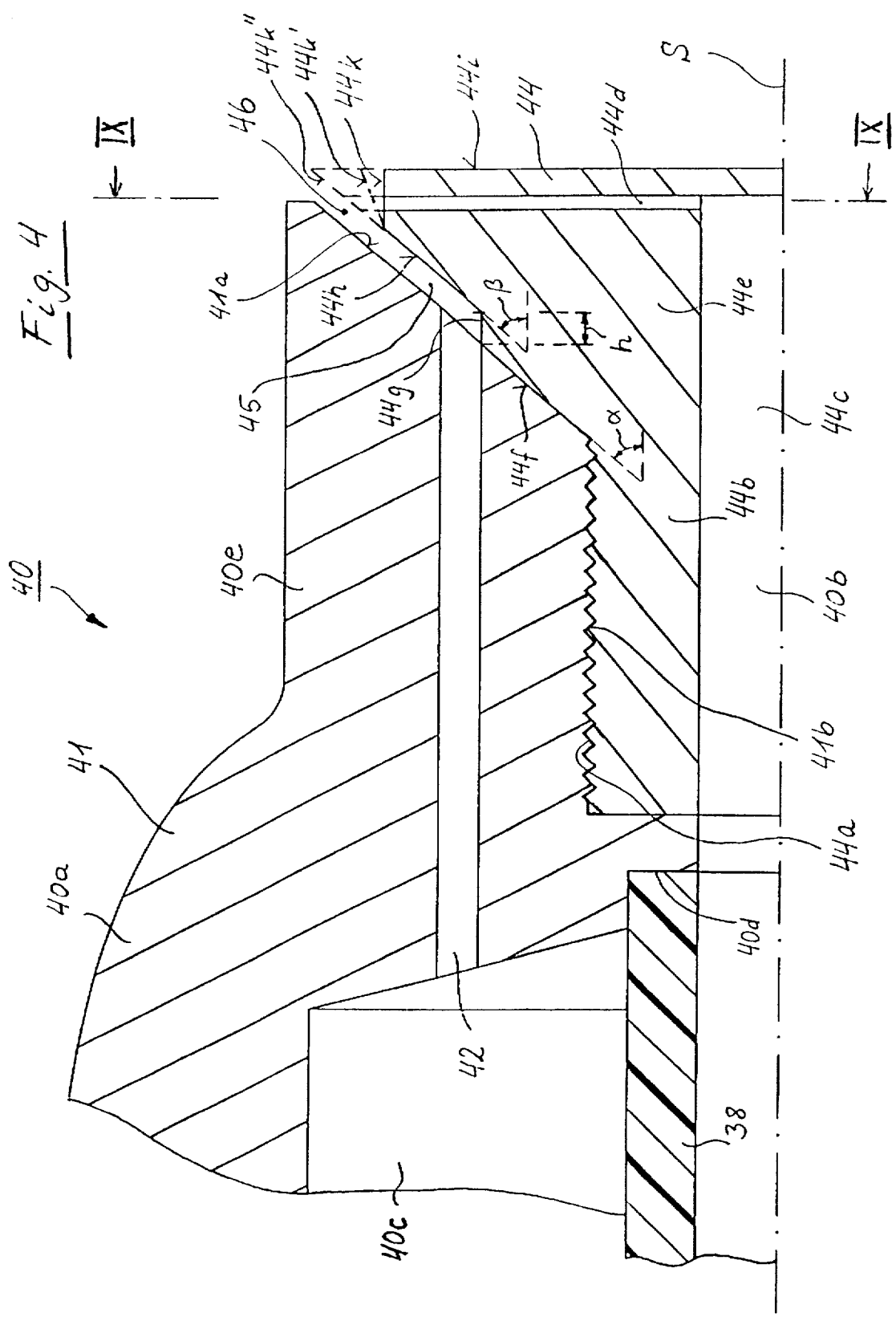
FIG. 4 is an enlarged detail of the spray nozzle according to FIG. 3.
Figure 5:
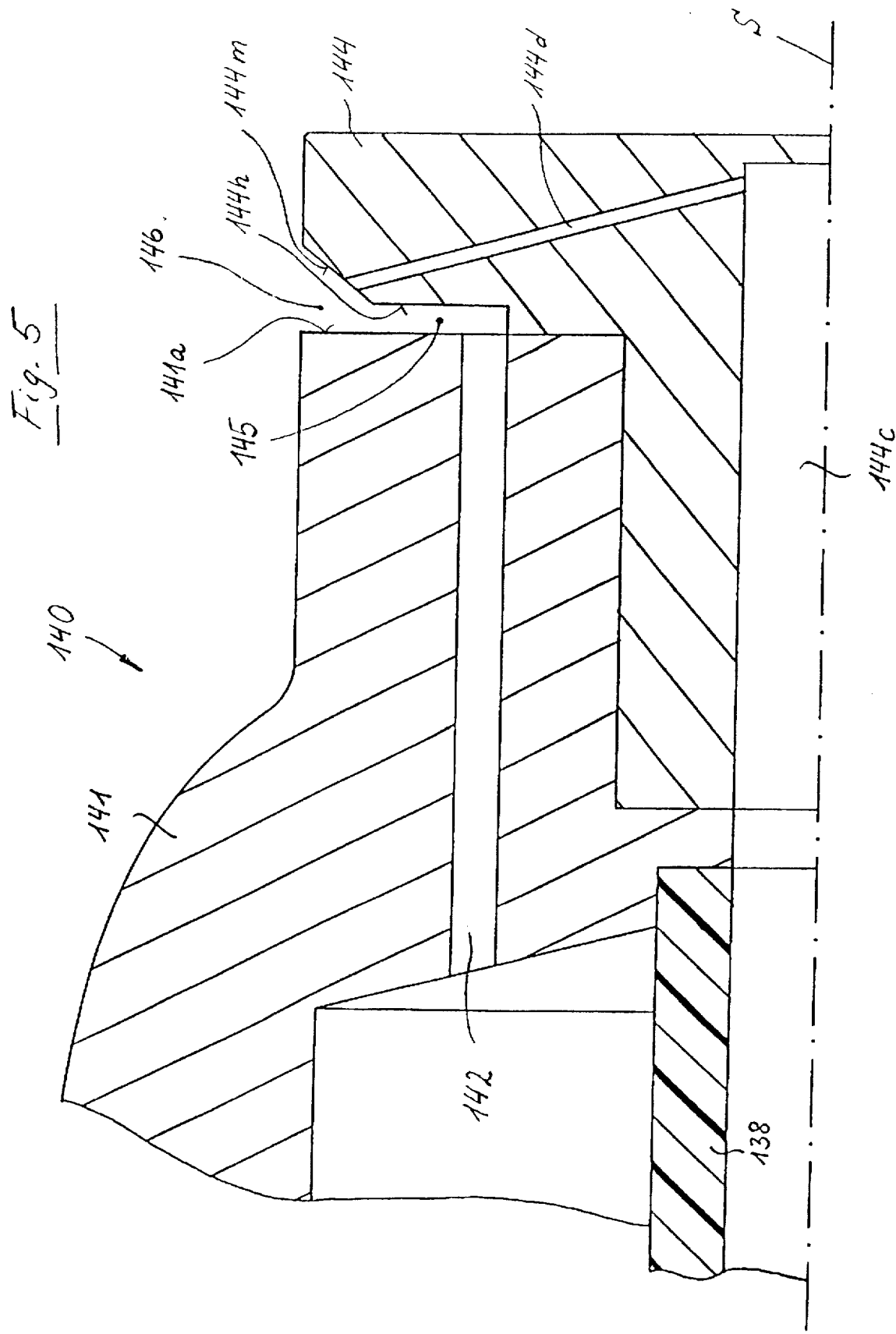
FIG. 5 is a view analogous to FIG. 4 of a further embodiment of a spray nozzle according to the invention.
Figure 6:
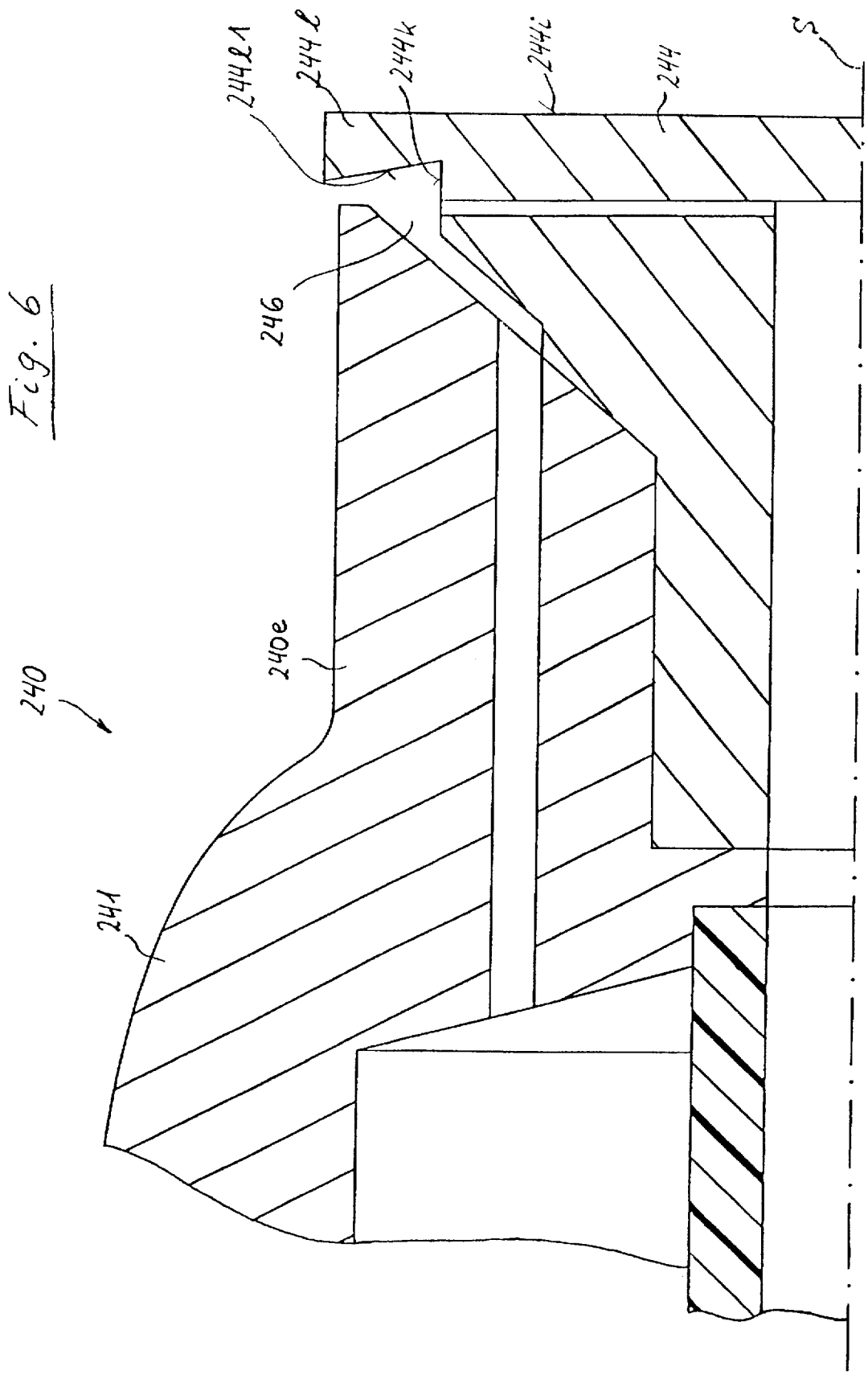
FIG. 6 is a view analogous to FIG. 4 of a third embodiment of a spray nozzle according to the invention.

FIG. 4 is an enlarged view of a nozzle element operating in accordance with the external mixing principle, wherein the ball joint 40a of the nozzle element 40 is only partially depicted in order to obtain as high an enlargement factor as possible. In this ball joint 40a a pocket hole 40c is formed by a nozzle inlet end 40c1 (see FIG. 3), the opening of the pocket hole facing the inside space 37b of the main part 37a of the nozzle assembly 37 (see FIG. 3). As shown in FIG. 4 the tubular section 38 projects into the pocket hole 40c from the left and is pressed into a recess 40d to form a reliable connection with the nozzle element 40. If desired, the tubular piece 38 can additionally be secured in the recess 40d by fastening means (not shown), for example by a stud screw.

In the direction of the nozzle axis S a cylindrical neck 40e follows the ball joint 40a. Together, the ball joint 40a and the cylindrical neck 40e form a basic body 41 of the nozzle element 40. This basic body 41 is depicted in FIG. 4 by hatching from top left to bottom right.

A plurality of blast air lines 42 running parallel to the nozzle axis S extend from the pocket hole 40c, which blast air lines open into a truncated cone surface area 1 of the basic body 41 at the right end of basic body 41 in FIG. 4. Preferably, the blast air lines 42 are arranged at the same distance from the nozzle axis S. The diameter of blast air lines 42 as well as their number can be chosen depending on the desired blast air flow rate. The basic body 41 can also be referred to as the blast air guiding member 41.

Extending from the radially inner end of the truncated cone surface area 41a of the basic member 41 this basic member 41 is provided with an internally threaded section 41b parallel to the nozzle axis S in the insertion member 44. An insertion member 44 having a shaft 44b provided with an external thread 44a is screwed into this internally threaded section. A main channel 44c is formed coaxially to the nozzle axis S, which main channel communicates with the tubular section 38 and forms part of the supply line for working medium. At its right end depicted in FIG. 4 the main channel 44c is closed and branches into a plurality of branch channels 44d which extend substantially radially. The insertion member 44 can also be referred to as the working medium guiding member 44.

With a first truncated section 44f a head portion 44e of the insertion member 44, which head portion is subsequent to the externally threaded section 44b, follows the externally threaded section 44b. In the region of the outlet openings of the blast air supply lines 42 in the truncated cone surface area 41 of the basic body 41 the first truncated section 44f changes into a second truncated section 44h by means of a step 44g. Through a cylinder face 44k into which the branch channels 44d open the second truncated section 44h is connected with a front face 44i of the insertion member 44, which front face extends orthogonally to the nozzle axis S and is depicted in FIG. 4 on the utmost right. The front face 44i also forms the nozzle outlet end of the spray nozzle 40.

With their truncated cone surface areas 41a and 44f, both of which enclosing the same angle a with the nozzle axis S, the basic body 41 and the insertion member 44 are in abutment. Due to the offset caused by the step 44g a blast air channel 45 is formed in between the second truncated section 44h of the insertion member 44 and the truncated cone surface area 41a of the basic body 41, which blast air channel 45, extending in the form of a funnel, increasingly moves away from the nozzle axis S starting from the openings of blast air supply lines 42. In case the truncated cone surface area 41a of the basic body 41 is predetermined the shape of the blast air channel 45 depends on the height h of step 44g on the one hand and on the inclination angle β enclosed by the second truncated section 44h of the insertion member 44 and the nozzle axis S on the other. For reasons of manufacturing technology it is preferred that the angles α and β have the same size, as also in the case of the spray nozzle 40 depicted in FIG. 4.

It is the object of the blast air channel 45 to give the blast air emerging from the blast air supply lines 42 a direction that is predetermined by the truncated cone surface areas 41a and 44h before it atomizes the working medium emerging from branch channels 44d.

In the region of discharge of working medium from the branch channels 44d an atomizing chamber 46 open to the environment 46 is formed between the basic body 41 and the insertion member 44, to be more precise by the radially outer edge area of the truncated cone surface area 41a and the cylinder face 44k. In principle it might be conceivable that the size of the atomizing chamber 46 is chosen to be smaller, as indicated in FIG. 4 by the dash-dot-dotted line of face 44k' or even that the provision of an atomizing chamber is completely omitted in accordance with the dashed line 44k". However, in particular in the case of the latter embodiment inevitably the problem would ensue that back pressure builds up in the supply system 38–44c–44d for working medium, which back pressure would negatively affect the function and in particular also the generation of noise of the entire spray nozzle 40. By providing the atomizing chamber 46 it is reliably prevented that such back pressure is built up.

The closer the opening of branch cannels 44d is arranged at the front face 44i of the insertion member 44 the more reliable can it be avoided that back pressure is built up, and the better the working medium can be atomized by blast air.

It is to be noted that the branch channels 44d do not have to extend orthogonally to the nozzle axis S at any rate. Rather can they also be arranged at an angle to it. Further it is to be noted that the confining surfaces of the blast air channel 45 do not necessarily have to be designed as truncated cone surface areas as in the case of the embodiment according to FIG. 4. Rather can any desired shape of surface be chosen as long as it is still ensured that the blast air channel can perform its object of giving the blast air stream the desired direction.

Figure 7B:
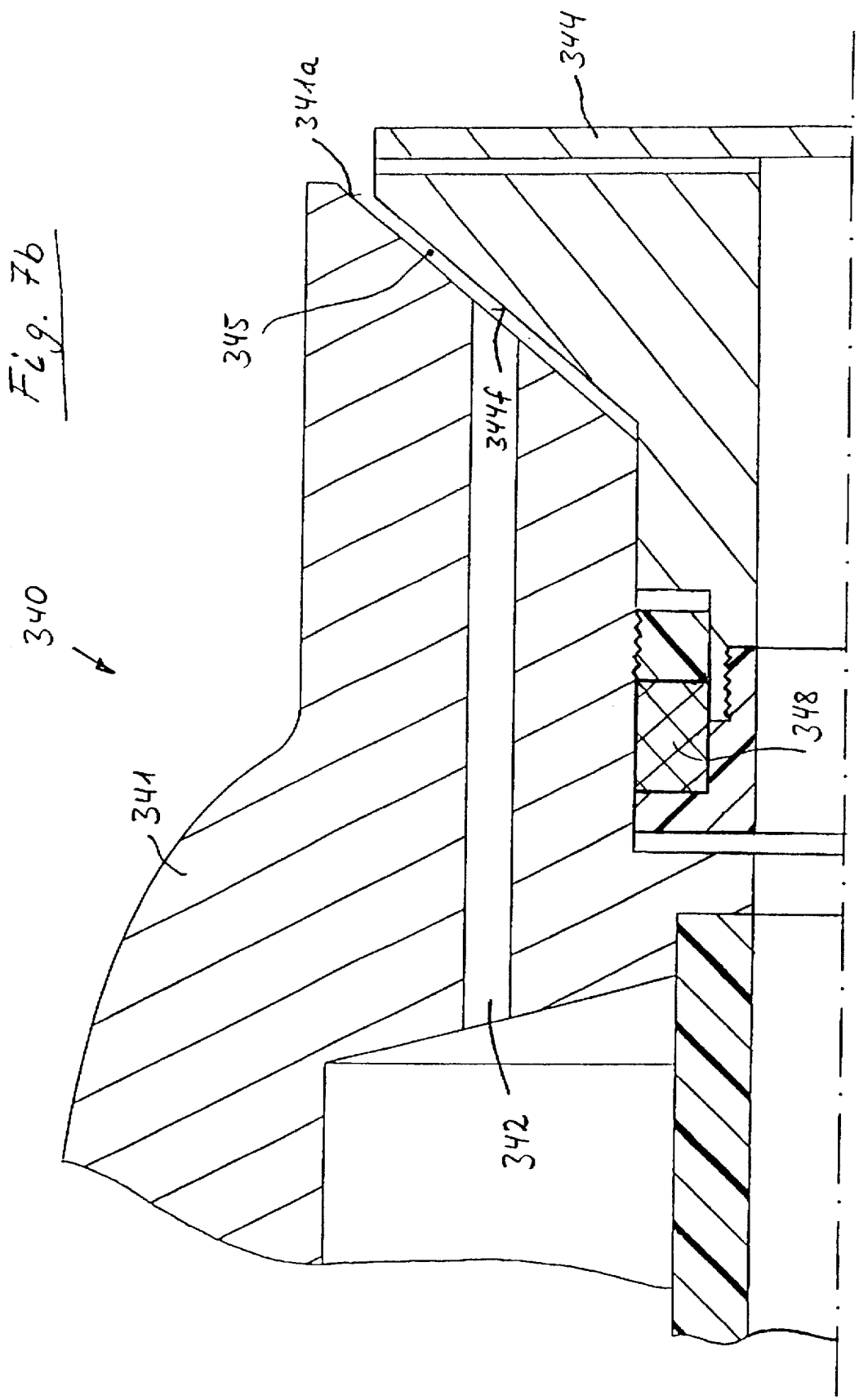

Using spray nozzle 40 according to FIGS. 3 and 4 it is possible to obtain the spraying image depicted in FIG. 3. The blast air flow $ST_A$ discontinued at the working medium guiding member 44 causes negative pressure $P_u$ in the region of the front face 44i of the working medium guiding member 44. This negative pressure $P_u$ contracts part of the spraying jet first emerging in the form of a conical envelope surface toward the nozzle axis S. The form of the spraying spot which owing to the conical envelope surface is expected to be annular is thereby blurred to result in a full circle. On the side of the blast air guiding member the negative pressure that is built up due to the discontinuity of the blast air flow $ST_B$ will always be compensated by ambient pressure. Thus the spraying jet is not fanned out and can thus extend substantially in the direction determined by the blast air channel substantially without interference. The negative pressure $P_u$ building up in the region of the front surface 44*i* of the working medium guiding member 44 cannot be compensated with ambient pressure.

FIG. 5 shows another embodiment of the spray nozzle according to the invention, substantially corresponding to the embodiment according to FIG. 4. Thus, in FIG. 5 analogous parts are denoted by the same reference numbers as in FIG. 4, except that they are increased by 100. In the following the embodiment according to FIG. 5 will only be described in so far as it differs from the embodiment according to FIG. 4 to the description of which reference is otherwise made.

The spray nozzle 140 exhibits a spraying characteristic that is directed substantially radially to the spraying axis S and is particularly suited for spraying inside peripheral surfaces of tubular parts. For this purpose the blast air channel 145 has a substantially orthogonal orientation to the nozzle axis S. On the side of the basic body 141 it is confined by an annular surface 141*a* and on the side of the insertion member 144 it is confined by an annular surface 144*h* spaced apart from the annular surface 141*a*. In the blast air channel 145 blast air supplied from the blast air lines 142 is distributed over the entire circumference of the nozzle element 140. In the region of the atomizing chamber 146 working medium is introduced into this blast air stream from branch channels 144*d*, which working medium then enters the branch channels 144*d* from the tubular element 138 and via the main channel 144*c*. The atomizing chamber 146 is encompassed by the annular surface 141*a* and a truncated surface area 144*m*. According to FIG. 5 the branch channels 144*d* do not run orthogonally to the nozzle axis S. Further, the insertion member 144 is not screwed into the basic body 141, but it is frictionally engaged with the basic body 141 by pressing.

In contrast to conventional spray elements which required a whole crown of spray nozzles for spraying the inside peripheral surface of a pipe, only one single spray nozzle 140 is sufficient according to the invention. Thus, it is now possible to spray the inside wall faces of small diameter pipes as well.

FIG. 6 shows another spray nozzle having annular jet characteristic, which substantially corresponds to the embodiment according to FIG. 4. Thus, in FIG. 6 analogous parts are denoted by the same reference numbers as in FIG. 4, except that they are increased by 200. In the following the embodiment according to FIG. 6 will only be described in so far as it differs from the embodiment according to FIGS. 4 and 5 to the description of which reference is otherwise made.

The major difference between the spray nozzle 240 according to FIG. 6 and the spray nozzle 40 according to FIG. 4 resides in the fact that an impact plate 244*l* integral with the front face 244*i* of the insertion member 244 is provided. The impact plate 244*l* projects beyond the cylinder face 244*k* at least up to the outside peripheral edge of the cylinder neck 240*e* of basic body 241. In accordance with the embodiment illustrated in FIG. 6 the impact plate 244*l* even projects slightly beyond this peripheral edge. With a confining surface 244*l*1 inclined relatively to the nozzle axis S "to the rear", i.e., in FIG. 6, radially outward and to the left, the impact plate 244*l* confines the atomizing chamber 246 thus effecting that the spraying mist is ejected from the working chamber 246 in radial direction to the nozzle axis S, and with a slight reverse jet characteristic predetermined by the inclination of the suface 244*l*1, respectively.

According to the embodiment of FIG. 5 the insertion member 244 is further frictionally engaged with the basic body 241 by pressing.

FIGS. 7*a* and 7*b* show another embodiment of the spray nozzle according to the invention, which substantially corresponds to the embodiment according to FIG. 4. Thus, analogous parts are denoted by the same reference numbers as in FIG. 4, except that they are increased by 300. In the following the embodiment according to FIGS. 7*a* and 7*b* will only be described in so far as it differs from the embodiment according to FIGS. 4 and 5 to the description of which reference is otherwise made.

Spray nozzle 340 according to FIG. 7*a* is a spray nozzle referred to as a "flutter valve" spray nozzle, wherein the insertion member 344 is arranged with relative movability to the basic body 341. The insertion member 344 is fixed in the neutral position relative to the basic body 341, as depicted on FIG. 7*a*, by means of a flexible biassing element, in the present case an annular rubber buffer.

On the side of the insertion member the rubber buffer 348 rests against an annular flange 349*a* of a threaded neck 349 of insertion member 344. The neck piece 349 is screwed onto the insertion member 344 at 349*b*. At the side of the basic body the rubber buffer 348 rests against an annular element 350 which is screwed onto the basic body 341 at 350*a*. The annular element 350 together with the shaft section 344*b* of the insertion member 344 are displacable in the direction of the nozzle axis S, however, not fastened one on the other in a manner to be rotatable about axis S, for example by means of wedge tooth engaging means 350*b* indicated in FIG. 7*a* by a dashed line.

Assembly of the spraying nozzle 340 according to FIG. 7*a* may proceed as follows. First, annular element 350 is mounted on the shaft section 344*b* of the insertion member 344 such that these two elements are in engagement by way of wedge tooth engaging means 350*b*. Then, the rubber buffer 348 is placed on the annular element 350 and finally the neck piece 349 is screwed onto the shaft piece 344*b* of the insertion member 344. Now, the insertion member 344 is instroduced into the basic body 341 from the right in FIG. 7, the threaded connection 350*a* between the annular element 350 and the basic body 341 being accomplished by turning the head portion 344*e* of the insertion member 344, bringing about engagement of wedge tooth engaging means 350*b*, until the truncated cone surface area 344*f* of the insertion member 344 rests on the truncated cone surface area 341*a* of basic body 341.

In the case of the embodiment according to FIG. 7*a* the truncated cone surface area 344*f* continues up to the cylinder face 344*k* into which the branch channels 344*d* for supplying working medium open. Due to this fact the blast air channel 345 has an imperceptible cross-sectional area when the nozzle element 340 according to FIG. 7*a* is in its neutral position.

If blast air pressure is then conducted into the blast air lines 342 the pressure force generated by this air pressure acts on the truncated cone surface area 344f and aims at lifting the latter off the truncated cone surface area 341a of the basic body 341 opposite to the flexible biassing force of the rubber buffer 348, i.e. moving the insertion member 344 relatively to the basic body 341 in the direction of the nozzle axis S to the right in FIG. 7a. If the blast air pressure is high enough, the insertion member 344 will actually lift off from the basic body 341 while opening the blast air channel 345, as shown in FIG. 7b. Owing to the dynamics of this lifting process the rubber buffer will be compressed stronger than would actually result from the blast air pressure force applied. Thus, the movement of the insertion member 344 is again reversed under the influence of the ruber buffer 348 and the insertion body 344 is again approximated to its neutral position. This movement also goes beyond a position of equilibrium defined by an equilibrium of forces existing between the flexible biassing force of the rubber buffer and the blast air pressure force applied. The insertion member 344 performs periodic movements about this position of equilibrium. The spray nozzle 340 "flutters".

It is to be noted that also in the neutral position according to FIG. 7a the blast air channel 345 can have a perceptible minimum cross-sectional area. In this regard it has to be observed that the minimal cross sectional area is dimensioned small enough that it is ensured that the spray nozzle 340 starts fluttering. If the blast air pressure is too high, resulting in too high a blast air flow rate through the blast air channel 345, the spray nozzle 340 actually is transferred from the fluttering condition into a stationary condition wherein the insertion member 344 assumes the position of equilibrium resulting from the respective flexible biassing force and the blast air pressure force.

Figure 8:
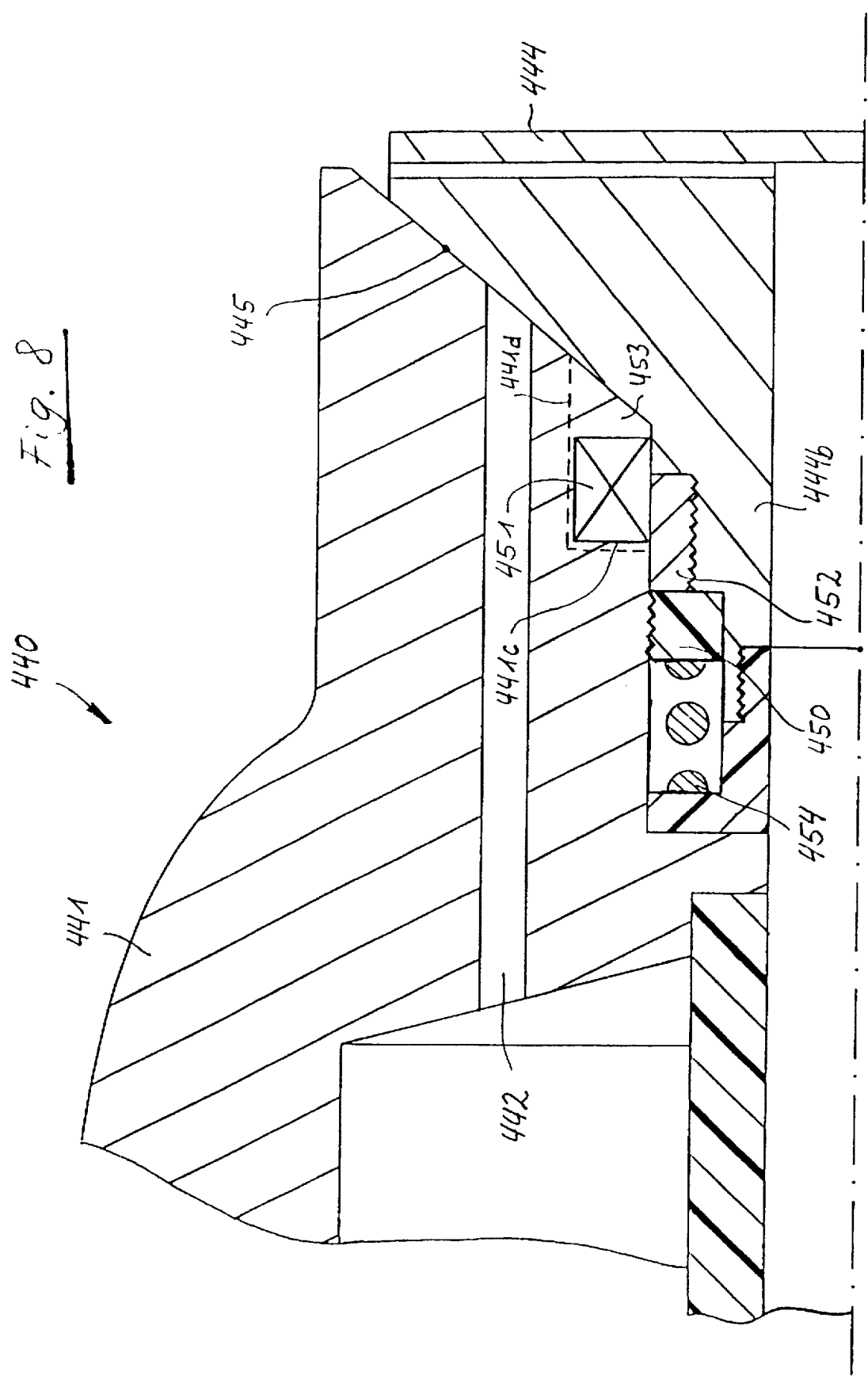
FIG. 8 is a view analogous to FIG. 4 of a fifth embodiment of a spray nozzle according to the invention.

FIG. 8 shows a further emodiment of a spray nozzle according to the invention, only marginally differing from the embodiment according to FIGS. 7a and 7b. Analogous parts are denoted by the same reference numbers as in FIGS. 7a and 7b, except that they are increased by another 100, i.e. increased by 440 with respect to FIG. 4. In the following the embodiment according to FIG. 8 will only be described in so far as it differs from the embodiment according to FIGS. 7a and 7b to the description of which reference is otherwise made.

On the one hand the spray nozzle 440 according to FIG. 8 differs from the embodiment according to FIG. 7a and 7b in that for biassing the insertion member 444 into the neutral position a helical compression spring 454 is provided in place of a rubber buffer.

On the other hand the winding 451 of an electromagnet is provided in the basic body 441 and an armature element 452 of the electromagnet is provided on the shaft section 444b of the insertion member 444. In the case of the embodiment shown the armature element 452 in the form of a ferromagnetic ring is screwed onto the shaft section 444b during manufacture, prior to the application of the annular element 450. The magnet winding 451 may be inserted into a recess 441c that is provided in the basic body 441 for this purpose, but as indicated by the dashed line in FIG. 8 it can also be encased by a housing 453 made of artificial resin, or the like, which is inserted into a turn-out 441d provided in the basic body 441 from the right side in FIG. 8.

In the embodiment according to FIG. 8 the electromagnet 451/452 acts on the insertion member 444 in the same direction as the blast air applied via the blast air supply lines 442, i.e. opposite to the flexible bias exerted by the spring 454.

The electromagnet 451/452 can be used in a variety of ways. For example, it can be excited constantly so as to award a minimal pre-opening cross-section to the blast air channel when the spray nozzle 440 is in its neutral position. Furthermore, it can be excited periodically so as to impose a desired fluttering frequency on the fluttering of the spray nozzle 440. Finally, it can also be used for stabilization of the fluttering motion of the spray nozzle 440 in the case of low blast air pressure values. These three aforementioned options are not to be understood as a comprehensive enumeration of examples of possible applications for the electromagnet 451/452.

It is to be noted that the electromagnet 451/452 of course may be arranged such that it counteracts the blast air pressure force.

Figure 9:
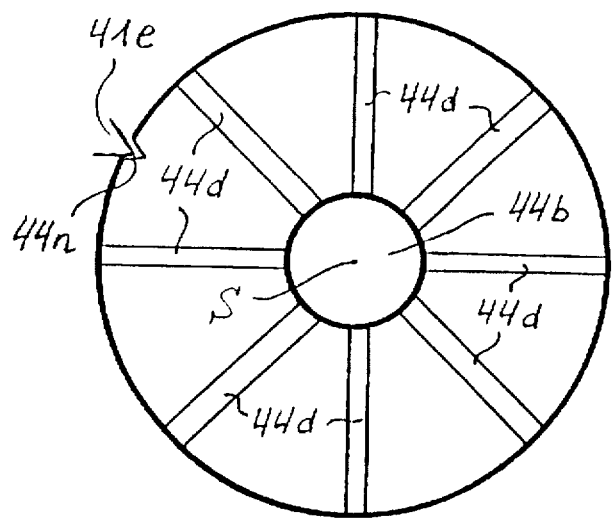
FIG. 9 is a sectional view taken along line IX—IX in FIG. 4 to illustrate the distribution of working medium branch channels over the circumference of the spray nozzle.
Figure 10:
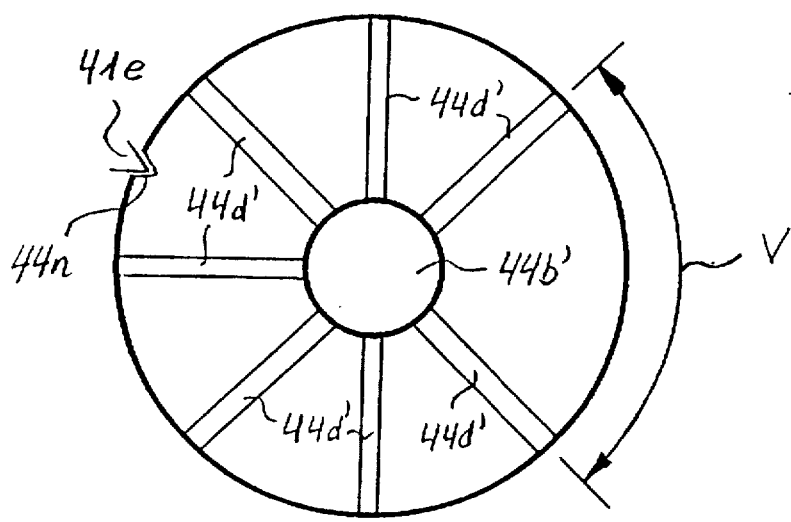
FIG. 10 is a view analogous to FIG. 9 of a modified distribution of these channels.
Figure 11:
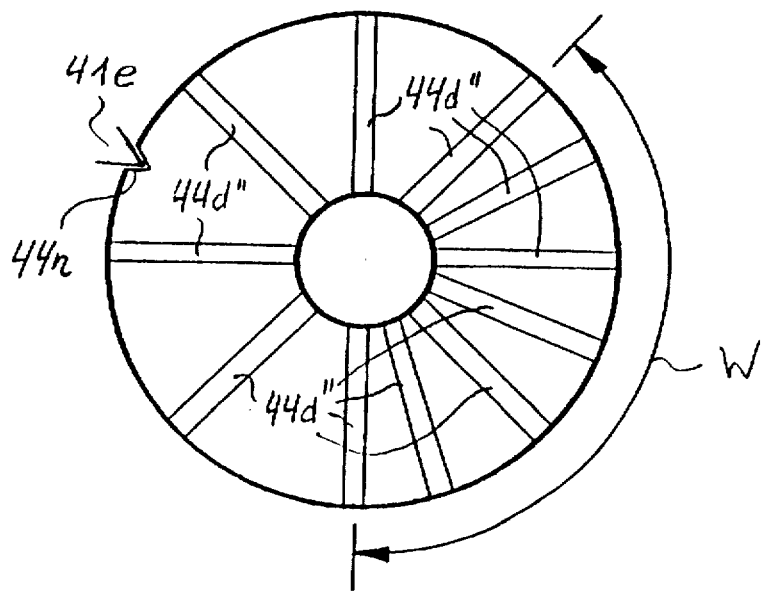
FIG. 11 is a view analogous to FIG. 9 of a further modification of this distribution.

FIGS. 9 to 11 show three different possibilities wherein the branch channels 44d can be located around the main channel 44b, and the nozzle axis S, respectively.

According to FIG. 9 the branch channels 44d are located around the main channel 44b, spaced apart from one another by the same circumferential angular distance. In the embodiment shown in FIG. 9, eight branch channels are arranged each at an angular distance of 45° from one another. However, also any arbitrary number of branch channels can be provided if these branch channels are arranged at a regular angular distance. For example, six branch channels can be provided at an angular distance of 60° each.

The distribution depicted in FIG. 10 differs from the distribution according to FIG. 9 in that a smaller number of branch channels is provided throughout the angular section V. For example, in the angular section V depicted in FIG. 10 no branch channel is provided at all. Branch channels 44d' having a regular angular distance are provided throughout the remaining periphery around the main channel 44b'.

In the case of the variation of the distribution as according to FIG. 11 an increased number of branch channels 44d" is arranged in angular section W as compared to the remaining angular section. For example, six branch channels 44d" at an angular distance of 22.5° each are arranged in the angular section W (the border branch channels of angular section W only count as half belonging to this angular section W), whereas in the remaining peripheral section five branch channels 44d" are arranged at an angular distance of 45° each.

It is of course possible that in one and the same spray nozzle there are provided sections with increased and reduced branch channel densities at the same time. FIGS. 9 to 11 further show a schematic drawing of a catching notch 44n of the insertion member 44 and a catching pin 41i of the basic body 41 which serve to maintain a desired relative orientation of the insertion member 44 and the basic body 41.

Emphasis is put on the fact that the features discussed above with reference to various exemplified embodiments can also be combined with each other in applications covering more than only one exemplified embodiment. For example, it is conceivable to operate a spray nozzle having radial spraying characteristic as according to FIGS. 5 and 6 as a flutter valve sray nozzle analogous to FIG. 7a and 7b, and FIG. 8, respectively.

The invention further relates to a spraying device, in particular for spraying forming parts of a forming machine, having a plurality of spray elements, each spray element having a basic unit and at least one spray nozzle device, further at least one supply channel for working medium and at least one supply channel for blast air being provided in the basic unit, further at least one working medium supply line and at least one blast air supply line being provided in the spray nozzle device, and the at least one working medium supply line being connectable to the at least one working medium supply channnel and the at least one blast air supply line being connectable to the at least one blast air supply channel.

From DE 44 20 679 A1 a generic two-component spraying device is known; wherein on a spray tool a plurality of individual spray elements is arranged in several rows situated adjacent and underneath one another. Such spraying devices are used as, for example, die spraying devices as required in die-casting, drop forging, and other manufacturing processes of hot and cold forging in order to prepare the forming parts after one operation for the following operation. After having opened the die, the spray tools are moved in between the die parts for this purpose, which can then be cleared of metal residues, lubricant residues and other contaminants by means of compressed air, sprayed with lubricant and furthermore cooled with water. Then again, if it is desired to retrofit the forming device to manufacture a different component, the die part mounted on the clamping plates have to be removed first of all. Further, all two-component spray nozzles of the known die spraying device have to be adjusted in accordance with the "new" die parts. This procedure is tedious and troublesome.

In contrast to this it is the object of the present invention to provide a die spraying device useful in notably reducing the amount of time required for retrofitting the forming device.

According to the invention this object is attained in that at least two out of the plurality of spray elements are assigned a common, removable and interchangeable nozzle assembly which can be fastened to the basic units of the spray elements and comprises the spray nozzle devices, the at least one working medium supply line being connectable to the at least one working medium supply channel and the at least one blast air supply line being connectable to the at least one blast air supply channel via respective coupling sites of the interchangeable nozzle assembly and the basic units. To spray a specific forming part the spray nozzle devices require precise adjustment only once, namely when they are first used, and then, if it is desired to produce a different component in the forming machine, they can be removed and stored at a place remote from the die spraying device. On demand, the interchangeable nozzle device can then again be fastened on the basic units of the die spraying device. This requires comparatively little time.

The costs incurred to the manufacturer of components in that for each component to be produced he has to have in stock one or more of the interchangeable nozzle assemblies according to the invention have to be compared with the costs so far incurred by the working hours of his staff required for retrofitting. In particular it has to be noted that expensive functional parts of the spray elements, such as the metering valves for the working medium, can be located in the basic units so that they do not have to be provided in a corresponding number.

In case the interchangeable nozzle assembly includes a spray nozzle support on which the spray nozzle devices can be mounted, preferably releasably, the interchangeable nozzle assembly can be produced especially cost-efficient, since in this case at least a part of the spray nozzle devices may be designed identical. This allows their manufacture as a serial production article at correspondingly reduced manufacturing costs. The spray nozzle devices can then be mounted on the spray nozzle support serving as a base plate.

In order to ensure that the connection of the interchangeable nozzle assembly and the basic units can reliably be reproduced, it is suggested that on the side of the interchangeable nozzle assembly at least one of the coupling sites for working medium is provided with a rigid working medium connection piece facing the basic unit, one abutment face of the working medium connection piece sealingly cooperating with a mating abutment face of a basic unit assigned to it.

In a first alternative embodiment this rigid working medium connection piece can be designed as an essentially cylindrical tubular neck of the spray nozzle device, the cylindrical tubular neck having a cylindrical outside peripheral surface and a front face facing the basic unit, the central opening of the tubular neck forming the working medium supply line. To guarantee that the tubular neck is firmly secured in the coupled position of the interchangeable nozzle assembly and the basic units provisions can be made for the tubular neck to engage in a pot-shaped recess of the basic unit, the cylindrically shaped outside peripheral surface and the front face of the tubular neck facing the basic unit forming the abutment face.

However, according to a second alternative embodiment it is also possible that the rigid working medium connection piece is formed by a pot-shaped recess of the spray nozzle device, which recess comprises a cylindrical inside peripheral surface and a bottom face facing the basic unit, the working medium supply line opening into the bottom face of the pot-shaped recess. In this second alternative embodiment it is possible to ensure positive connection of the basic units and the interchangeable nozzle assembly in that the tubular neck of the basic unit engages in the pot-shaped recess of the spray nozzle device, the cylindrical inside peripheral suface together with the bottom face of the pot-shaped recess, which bottom face faces the basic unit, forming the abutment face.

To always be able to positively prevent that working medium emerges it is suggested in an embodiment of the invention that sealing means are provided between a cylindrical peripheral surface of the rigid working medium connection piece and a corresponding portion of the mating abutment face. In addition or as an alternative provisions can be made that sealing means are provided between a face of the rigid working medium connection piece facing the basic unit and a corresponding portion of the mating abutment face. In particular O-rings, paper seals and the like can be used as sealing means.

To be able to ensure that also the second spraying medium of the two-component spray nozzles, namely blast air, reproducibly flows from the basic units to the spray nozzle devices it is suggested in an embodiment of the invention that on the side of the interchangeable nozzle assembly at least one of the coupling sites for blast air is formed by a rigid blast air connection piece. In this connection it is possible that the blast air connection piece is formed by a an annular neck projecting toward one of the basic units and by a shoulder surrounding the annular neck.

To make it possible to fix the interchangeable nozzle assembly in the lateral direction as well, it is further suggested that the annular neck engages in a recess provided in the basic unit.

The requirements on tightness of the coupling sites for blast air are by far not as strict as those on the tightness of the coupling sites for working medium, provided only it is ensured that the blast air pressure required for atomizing the working medium in the spray nozzles is actually given. Normally, separate sealing means on the coupling sites for blast air may therefore be dispensed with. A sufficient sealing effect, for example, can be ensured in that an outside peripheral surface of the annular neck and an inside peripheral surface of the recess are designed in matched relationship with one another such that these two peripheral surfaces cooperate as a snug fit seal. This sealing effect can even be further improved in that the two peripheral surfaces are designed as conical envelope surfaces which taper from the interchangeable nozzle assembly toward the basic unit.

To allow for sufficient blast air throughput it is suggested that a plurality of blast air supply line sections be provided in the peripheral direction of the annular neck.

It is possible to achieve a particularly compact design for the spray nozzle device in that the tubular neck is situated in the center of the annular neck and in that the pot-shaped recess of the basic unit is situated in a bottom face of the recess. Alternatively, however, it is also possible that the pot-shaped recess of the interchangeable nozzle assembly is located in the center of the annular neck and that the tubular neck of the basic unit protrudes from a bottom face of the recess.

In these two aforementioned alternatives the coupling sites for working medium and blast air assigned to a spray nozzle device can be designed as an integral element on the side of the interchangeable nozzle assembly. Depending on their purpose the spray nozzle devices may be constructed in the most various ways. Simple and cost-efficient manufacture of the spray nozzle device can be achieved by means of a modular structure of the spray nozzle device in that, for example, the spray nozzle device comprises at least one fastening member for being fastened on the spray nozzle support and a nozzle tip for generating the spraying jet.

In this case the nozzle tip may be fixed on the fastening member directly or by way of an interposed extension unit. Depending on whether it is desired that the output direction of a specific spray nozzle assembly be adjustable or whether it is desired that this spray nozzle device consistently sprays in the same direction, the nozzle tip of this spray nozzle device may be mounted on the fastening member either pivotably or directionally stable.

Preferably the fastening member comprises a coupling element for the coupling of a flexible tubular member connecting the central opening for working medium of the fastening member with the nozzle tip, thus forming part of the working medium supply line. The fastening member and the coupling element, for example, can be fastened to one another by means of screwing.

At least one further section of the blast air supply line can easily be provided in that the fastening member comprises a cylindrical section protruding from the spray nozzle support in a direction facing away from the basic unit, which cylindrical section follows the plurality of blast air supply line sections of the annular neck. In this regard it is possible that in particular the additional blast air supply line section presents a substantially annular space provided between the cylindrical section and the flexible tubular member.

The nozzle tip may be fixedly disposed on the fastening member or on the extension unit by means of a union nut.

It may further be provided that an adapter unit for assembling a spray nozzle, in particular a pivotable spray nozzle, is provided on an extension unit.

Preferably the spray nozzle device operates in accordance with the external mixing principle.

In the following the invention will be explained in greater detail on the basis of embodiments with reference to the attached drawings.

Figure 12:
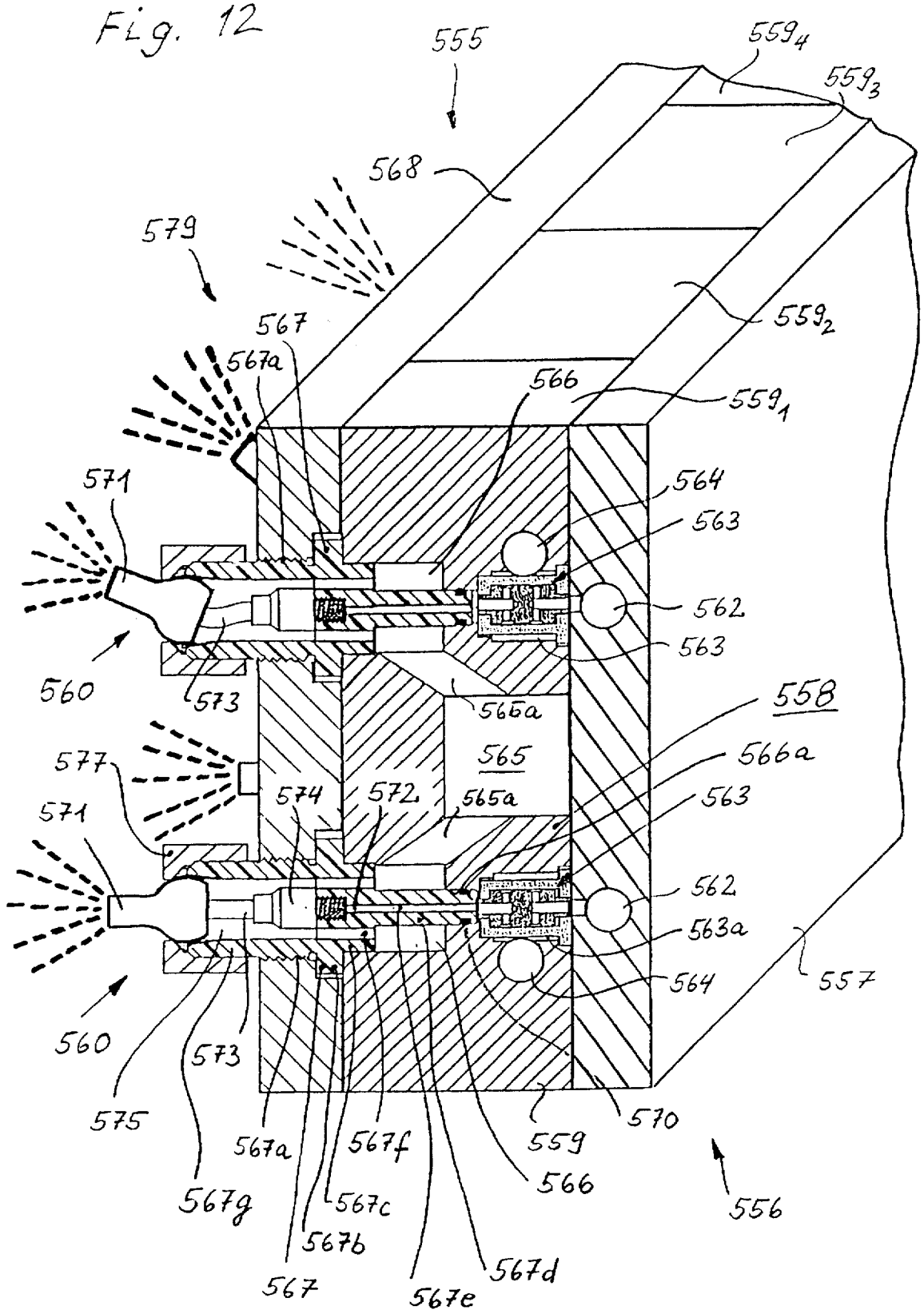
FIG. 12 is a partial view, partially sectional, of a first embodiment of a spray nozzle device equipped with an interchangeable nozzle assembly according to the invention.

The spraying tool 556 of the die spraying device 555 as depicted in FIG. 12 comprises a central support structure 557 onto which a plurality of spray elements 558 is mounted by means of fastening means that are not shown, for example by means of screws. Each spraying element 558 comprises a basic unit 559 and two spray nozzle devices 560. Four basic units $559_1$ to $559_4$ can be gathered from FIG. 12.

Supply means 562 for feeding liquid working medium to the two spray nozzle devices 560 of each spray element 558 are provided in the central support structure 557. These supply means 562 lead to metering valves 563 the structure and function of which has been described above, in particular with reference to FIG. 3. The metering valves 563 are accomodated in recesses 563a of the basic units 559 which are open towards the central support structure 557. In contrast to the two-piece housing 30a, 30b according to FIG. 3 it is thereby possible to construct the basic units 559 as a single piece, since in the assembled state of the spraying device 555 the metering valves 563 are retained in the recesses 563a by the central support structure 557.

In the basic units 569 it is further possible to discern control air supply means 564 for feeding control air by which the passage cross section of the metering valves 563 can be adjusted, as explained above in particular on the basis of FIG. 3.

Finally, the spray elements 558 comprise blast air supply means 565 common to both spray nozzle devices 560, which blast air supply means communicate with recesses 566 of the basic units through two branch channels 565a, which open toward the spray nozzle devices 560. Connection means 567 of the spray nozzle devices 560 are inserted in the recesses 566, the structure and function of the connection element being described in further detail below. Connection elements 567 are screwed into a spray nozzle support 568 by means of threads 567a, which spray nozzle support is common to all spray elements 558 and all basic units $559_1$ to $559_4$, respectively. The spray nozzle support 568 is mounted on the basic units $559_1$ to $559_4$ by means of fastening elements that are not shown, for example by means of screws. Together, the spray nozzle support 568 and the spray nozzle devices 560 form a removable and interchangeable nozzle assembly 579.

With an annular shoulder 567b the connection elements 567 rest on the basic units $559_1$ to $559_4$ and engage in the recess 566 via a neck in the shape of a circular disc 567c. A tubular neck 567d extends from the center of the circular disc 567c in the direction toward the metering valve 563 and, in the region of the metering valve 563, engages in a pot-shaped recess 566a formed at the bottom of the recess 566.

An O-ring 570 is arranged between the inside peripheral surface of the pot-shaped recess 566a and the outside peripheral surface of the tubular neck 567d, which O-ring is placed in an annular groove of the tubular neck 567e. This O-ring seal prevents that working medium enters the blast air supply means, in particular the recess 566, from the metering valve 563. In the center of the tubular neck 567d, a first section 567e of a working medium supply line 572 leading from the metering valve 563 to a nozzle tip 571 of the spray nozzle device 560 is provided.

A second section formed by a flexible tubular piece 573 is subsequent to the first section 567e of the working medium supply line 572. On its one end the flexible tubular piece is connected with the first section 567e by means of a coupling element 574 screwed into the tubular neck 567d, and on its other end it is connected with the nozzle tip 571 as described above in particular on the basis of FIGS. 4 to 8.

A plurality of bores 567f distributed in the circumferential direction are provided around the first section 567e of the working medium supply line 572, which bores constitute a first section of the blast air supply line leading to the nozzle tip 571. A second section of this blast air supply line 575 is radially outwardly confined by the inside peripheral surface of a tubular neck 567g of the connection piece 567 and radially inwardly by the outside peripheral surface of the flexible tubular piece 573 and the coupling elements 574.

The nozzle tip 571 which is pivotable in the embodiment according to FIG. 12 is fastened to the tubular neck 567g by means of a cap nut 577. With regard to the details of this fastening again reference is made to the foregoing description, in particular that of FIG. 3. Preferably, the pivotable nozzle tip 571 also operates in accordance with the external mixing principle that has been throuhgly exlained above.

No separate sealing means are provided between the annular member of the circular disc 567c, which annular member surrounds the tubular neck 567d, and the inside peripheral surface of the recess 566. Rather are the inside peripheral surface of the recess 566 and the outside peripheral surface of the neck 567 in the shape of a circular disk designed in matched relationship with one another such that a snug fit seal ensues from the state depicted in FIG. 12. The snug fit seal can be attained in particular by designing the peripheral surfaces of the reces 566 and the neck 567d in the shape of a circular disk as conical envelope surfaces that taper from the nozzle tip 571 toward the bottom of the recess 566. Another snug fit seal can be obtained by pressing the annular shoulder 567e against the basic unit 559. In contrast to the discharge of working medium, minor discharge of blast air can be tolerated provided it is ensured that the blast air pressure required for atomizing the working medium is given.

Figure 13:
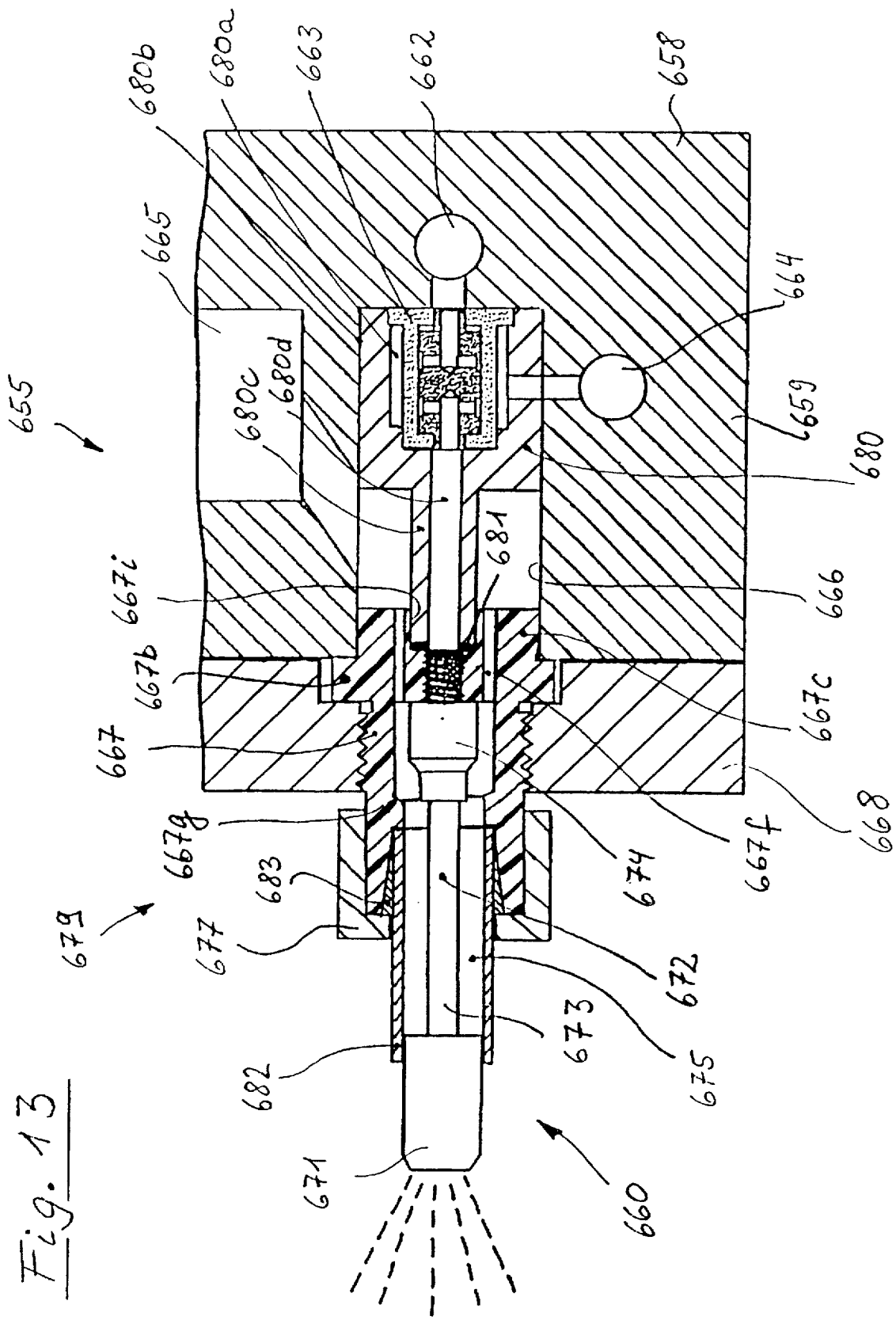
FIG. 13 is a partial section of a second embodiment of a die spraying device with an interchangeable nozzle assembly.

FIG. 13 shows a further embodiment of a die spraying device with an interchangeable nozzle assembly, substantially corresponding to the embodiment according to FIG. 12. In FIG. 13 analogous parts are thus denoted by the same reference numbers as in FIG. 12, except that they are increased by 100. In the following the embodiment according to FIG. 13 will only be described in so far as it differs from the embodiment according to FIG. 12 to the description of which reference is otherwise made.

Firstly, the die spraying device 655 according to FIG. 13 differs from the embodiment according to FIG. 12 in that all three supply means are provided in the basic unit 659, namely supply means 662 for working medium, supply means 664 for control air and supply means 665 for blast air. In the embodiment according to FIG. 13 the recess 666 also serves to accomodate the metering valve 663. To this end the metering valve 663 is inserted in a recess 680a of a holding element 680 which is screwed into the recess 666 by means of a thread 680b that is not illustrated in detail. A tubular neck 680c projects on the nozzle side end of the holding element 680, which tubular neck forms an end section 680d of the working medium supply channel. The tubular neck engages in a pot-shaped recess 667i of the annular neck 667c of the connection piece 667. A squeeze seal, for example a paper seal, is disposed between the front side of the tubular neck 680c and the bottom face of the pot-shaped recess 667i in order to prevent discharge of working medium.

The nozzle tip 671 of the embodiment according to FIG. 13 is a directionally stable nozzle tip. To this end the nozzle tip 671 is fastened in a tubular member 682, for example it is glued into the tubular member 682, which itself is fastened on the connection piece 667 by means of a union nut 677 and a cutting ring.

As in the case of the embodiment according to FIG. 12, also in the case of the embodiment according to FIG. 13 the nozzle piece 671 is connected with the working medium supply channel 662–680d of the basic unit 659 by means of a tubular member 673 and a coupling element 674, both defining the working medium supply line 672. Owing to the stable orientation of the nozzle tip 671 in the embodiment according to FIG. 13, the tubular piece 673 may also be a non-flexible tubular piece.

The blast air supply line is formed by bores 667f and the substantially annular chamber 675 which is confined radially outwardly by the tube 682 and the tubular neck 667g of the connection piece 667 and radially inwardly by the tubular piece 672 and the coupling element 674.

FIG. 14 shows a further embodiment of a spray nozzle device to be employed in the interchangeable nozzle assembly according to the invention. The spray nozzle device according to FIG. 14 substantially corresponds to the spray nozzle devices according to FIGS. 12 and 13. Thus, analogous parts are denoted by corresponding reference numbers, except that they are increased by 200 with respect to FIG. 12 and by 100 with respect to FIG. 13.

The spray nozzle device 760 according to FIG. 14 includes a pivotable nozzle tip 771. However, this pivotable nozzle tip 771 is not disposed in the immediate vicinity of the spray nozzle support 768 as is the case in the embodiment according to FIG. 12, but rather is it disposed at some distance from the spray nozzle support 768 by means of an extension tube 782 and an adapter unit 785. The extension tube 782 is mounted on the connection piece 767 by means of a cutting ring 783 and a union nut 777, as described above with regard to the embodiment according to FIG. 13.

The adapter unit 785 includes a basic member 785a to which the extension tube 782 is connected by means of a cutting ring 785b and a union nut 785c. At its end facing away from the spray nozzle support 768 the adapter unit 785 is provided with a tubular neck 785d which is designed for accomodating the nozzle tip 771 and for fixing the nozzle tip 771 by means of a cap nut 758e. With regard to the nature of this embodiment reference is made in particular to the description of FIG. 3.

Working medium is supplied to the nozzle tip 771 via a flexible tubular piece 773 which is connected to the connection piece 767 by means of a coupling element 774. The design of the connection piece 767 on the side of the basic unit is not illustrated in FIG. 14. In this case the connection piece 767 can either be designed as in accordance with FIG. 12 or as in accordance with FIG. 13.

It is to be noted that the features described above on the basis of individual embodiments, namely the embodiments according to FIGS. 12, 13 and 14, can also be combined to form embodiments that have not been explicitly described. For example, a directionally stable nozzle tip, as has been described e.g. with regard to the embodiment according to FIG. 13, can be fixed on a connection piece which is provided with a tubular neck corresponding to the tubular neck 567d of the embodiment according to FIG. 12.

What is claimed is:

1. Two-component spray nozzle (40), in particular for die spraying devices (1), comprising:

a nozzle inlet end (40c1) for working medium and blast air as well as a nozzle outlet end (44i), a blast air guiding portion (41) having at least one blast air supply line (42) connectable with supply means (24) for blast air, and a working medium guiding portion (44) having at least one working medium supply line (44c/44d) connectable with supply means (22) for working medium, characterized in that there is provided at least one blast air channel (45) between the blast air guiding portion (41) and the working medium guiding portion (44), which blast air channel is subsequent to the at least one blast air supply line (42) and extends from the nozzle inlet end (40c1) toward the nozzle outlet end (44i) at an increasing distance to a spraying axis (S) defined by these two ends and in that the at least one working medium supply line (44c/44d) extending in the working medium guiding portion (44) opens into an end portion (46) of the at least one blast air channel (45).

2. Spray nozzle according to claim 1,
characterized in that the working medium guiding portion (44) is fixedly disposed on the blast air guiding portion (41).

3. Spray nozzle according to claim 1,
characterized in that the blast air guiding portion (41) and the working medium guiding portion (44) are shaped as separate bodies.

4. Spray nozzle according to claim 3,
characterized in that the working medium guiding portion (44) is frictionally fitted, into the blast air guiding portion (41).

5. Spray nozzle according to claim 3,
characterized in that the working medium guiding portion (44) is screwed into the blast air guiding portion (41).

6. Spray nozzle according to claim 1,
characterized in that the blast air channel (45) extends at a constant angle relative to the nozzle axis (S).

7. Spray nozzle according to claim 6,
characterized in that, on the side of the blast air guiding portion (41), the blast air channel (45) is at least partially confined by a truncated cone surface area (41a).

8. Spray nozzle according to claim 6,
characterized in that, on the side of the working medium guiding portion (44), the blast air channel (45) is at least partially confined by a truncated cone surface area (44h).

9. Spray element according to claim 8,
characterized in that the truncated cone surface areas (44h) of the working medium guiding portion (44) and (41a) of the blast air guiding portion (41), which truncated cone surface areas confine the blast air channel (45) enclose different angles ($\alpha$, $\beta$) with the nozzle axis (S).

10. Spray nozzle according to claim 9,
characterized in that the angle ($\beta$) enclosed by the truncated cone surface area (44h) of the working medium guiding portion (44) and the nozzle axis (S) and the angle ($\alpha$) enclosed by the truncated cone surface area (41a) of the blast air guiding portion (41) and the nozzle axis (S) are adjusted such that the blast air channel (45) has a constant cross sectional area along the path of the blast air.

11. Spray element according to claim 7,
characterized in that the truncated cone surface areas (44h) of the working medium guiding portion (44) and (41a) of the blast air guiding portion (41), which truncated cone surface areas confine the blast air channel (45), together with the nozzle axis (S) enclose the same angle ($\alpha$=$\beta$).

12. Spray nozzle according to claim 7,
characterized in that at least one of the truncated cone surface areas (44h) of the working medium guiding portion (44) and (41a) of the blast air guiding portion (41), which truncated cone surface areas confine the blast air channel (45), together with the nozzle axis (S) encloses an angle ($\alpha$, $\beta$) between 40° and 70°.

13. Spray nozzle according to claim 12,
characterized in that the working medium guiding portion (44) and the blast air guiding portion (41) have seat faces (44f, 41a) designed for mutual abutment with one another, the working medium guiding portion (44) and the blast air guiding portion being provided with a step section (44g) between the respective seat face (44f) and a respective blast air channel confining surface (44h).

14. Spray nozzle according to claim 1,
characterized in that the end portion of the blast air channel (45) is expanded to form an atomizing space (46).

15. Spray nozzle according to claim 14,
characterized in that, on the side of the working medium guiding portion (44), the atomizing space (46) is confined by a face (44k) extending substantially parallel to the nozzle axis (S) and by a truncated cone surface area (41a) on the side of the blast air guiding portion (41).

16. Spray element according to claim 1,
characterized in that, on the side of the working medium guiding portion (144) and on the side of the blast air guiding portion (141), the blast air channel (145) is confined by an annular face (144h, 141a) extending substantially orthogonally to the nozzle axis (S) and that, if desired, an atomizing space (146) is provided in the end portion of the blast air channel (145), which atomizing space is confined by a truncated cone surface area (144m) on the side of the working medium guiding portion (144) and by the annular face (141a) on the side of the blast air guiding portion (141).

17. Spray nozzle according to claim 1,
characterized in that at the nozzle outlet end (224i) of the working medium guiding portion (244) there is arranged an impact element (244l), in particular an impact plate, which extends substantially orthogonal to the nozzle axis (S).

18. Spray nozzle according to claim 17,
characterized in that a face (244l1) of the impact element (244l), which face is adjacent to the opening for the working medium, together with the nozzle axis (S) encloses a right angle.

19. Spray nozzle according to claim 17,
characterized in that a face (244l1) of the impact element (244l), which face is adjacent to the opening for the working medium, together with the orthogonal to the nozzle axis (S) encloses an acute angle.

20. Spray nozzle according to claim 19,
characterized in that the impact element (244l)—at least in its extension orthogonal to the nozzle axis (S)—has at least the same dimension as the blast air guiding portion (24l).

21. Spray nozzle according to claim 17,
characterized in that the impact element (244l) is formed integral with the working medium guiding portion (244).

22. Spray nozzle according to claim 1,
characterized in that the working medium supply line (44c/44d) comprises a central working medium main channel (44c) originating from the nozzle inlet end (40c1), which working medium main channel, in the region of the nozzle outlet end (44i) branches into a plurality of working medium branch channels (44d) opening into the blast air channel (45).

23. Spray nozzle according to claim 22,
characterized in that the working medium branch channels (44d) may extend substantially orthogonally to the nozzle axis (S).

24. Spray nozzle according to claim 22, characterized in that the working medium branch channels (44d) are uniformly distributed over the circumference of the working medium guiding portion (44).

25. Spray nozzle according to claim 22, characterized in that the working medium guiding portion (44) has circumferential sections (W) with an increased density of working medium branch channels (44d").

26. Spray nozzle according to claim 25, characterized in that the working medium guiding portion (44) has circumferential sections (V) with a reduced density of working medium branch channels (44d').

27. Spray nozzle according to claim 1, characterized in that means (41e, 44n) are provided for maintaining the relative orientation of the working medium guiding portion (44) and the blast air guiding portion (41), characterized in that the working medium guiding portion (344, 444) is movably arranged on the blast air guiding portion (341, 441), characterized in that the working medium guiding portion (344, 444) is flexibly biased into a neutral position relative to the blast air guiding portion (341, 441), characterized in that the working medium guiding portion (344, 444) is biased into a neutral position by means of a rubber buffer element (348) or by means of a helical spring (454), characterized in that the movement of the working medium guiding portion (344, 444) relative to the blast air guiding portion (341, 441) is controlled by use of an externally influenceable control force, characterized in that the control force consists of fluidic pressure force, hydraulic force generated by working medium pressure, fluidic pressure force generated by separate control medium.

28. Spray nozzle according to claim 27, characterized in that for generating the control force there is provided an actuator (451/452), characterized in that the winding (451) of an electromagnet (451/452) is arranged in the working medium guiding portion or in the blast air guiding portion, while the respective other portion, is at least partially designed as the armature element (452) of the electromagnet (451/452), characterized in that in a neutral position of the working medium guiding portion (344, 444) relative to the blast air guiding portion (341, 441) the blast air channel (345, 445) has a substantially imperceptible cross-sectional area, characterized in that (at 40a) it is designed to be pivotably mounted on a higher-ranking structure.

29. Spraying device (555; 655), in particular for spraying forming parts on a forming machine, having a plurality of spray elements (558; 658), each spray element having a basic unit (559; 659) and at least one spray nozzle device (560; 660), further at least one supply channel (562; 662) for working medium and at least one supply channel (565; 665) for blast air being provided in the basic unit (559; 659), further at least one working medium supply line (567e–574-572; 674-672) and at least one blast air supply line (567f–575; 667f–675) being provided in the spray nozzle device (560; 660), and the at least one working medium supply line being connectable to the at least one working medium supply channel and the at least one blast air supply line being connectable to the at least one blast air supply channel characterized in that at least two out of the plurality of spray elements (558; 658) are assigned a common, removable and interchangeable nozzle assembly (579; 679) which can be fastened to the basic units (559; 659) of the spray elements and comprises the spray nozzle devices (560; 660), the at least one working medium supply line being connectable to the at least one working medium supply channel and the at least one blast air supply line being connectable to the at least one blast air supply channel via respective coupling sites (567d/566a, 567c/566; 667i/680c, 667c/666) of the interchangeable nozzle assembly (579; 679) and the basic units (559; 659).

30. Spraying device according to claim 29, characterized in that the interchangeable nozzle assembly (579; 679) includes a spray nozzle support (568; 668; 768) on which the spray nozzle devices (560; 660; 760) can be mounted, releasably, characterized in that, on the side of the interchangeable nozzle assembly (579; 679), at least one of the coupling sites for working medium is provided with a rigid working medium connection piece (567d; 667c/667i) facing the basic unit, one abutment face of the working medium connection piece sealingly cooperating with a mating abutment face of a basic unit (559; 659) assigned to it, characterized in that the rigid working medium connection piece is designed as an essentially cylindrical tubular neck (567d) of the spray nozzle device (560), the cylindrical tubular neck having a cylindrical outside peripheral surface and a front face facing the basic unit (559), the central opening (567e) of the tubular neck (567d) forming at least a section of the working medium supply line, characterized in that the tubular neck (567d) engages in a pot-shaped recess (566a) of the basic unit (559), the cylindrical outside peripheral surface and the front face, of the tubular neck facing the basic unit forming the abutment face, characterized in that the rigid working medium connection piece is formed by a pot-shaped recess (667i) of the spray nozzle device (660), which recess comprises a cylindrical inside peripheral surface and a bottom face facing the basic unit (659), the working medium supply line (672–674) opening into the bottom face of the pot-shaped recess (667i), and characterized in that a tubular neck (680c) of the basic unit (659) engages in the pot-shaped recess (667i) of the spray nozzle device (660), the cylindrical inside peripheral surface together with the bottom face of the pot-shaped recess, which bottom face faces the basic unit, forming the abutment face.

31. Spraying device according to claim 30, characterized in that, on the side of the interchangeable nozzle assembly (579; 679), at least one of the coupling sites for blast air is formed by a rigid blast air connection piece (567c; 667c), characterized in that the blast air connection piece is formed by a an annular neck (567c; 667c) projecting toward one of the basic units and by a shoulder (567b; 667b) surrounding the annular neck, characterized in that the annular neck engages in a recess (566; 666) of the basic unit, characterized in that an outside peripheral surface of the annular neck (567c; 667c) and an inside peripheral surface of the recess (566; 666) are designed in matched relationship with one another such that these two peripheral surfaces cooperate as a snug fit seal, characterized in that the two peripheral surfaces are designed as conical envelope surfaces which taper from the interchangeable nozzle assembly toward the basic unit, and characterized in that a plurality of blast air supply line sections (567f; 667f) is distributed in the peripheral direction of the annular neck (567c; 667c).

32. Spraying device according to one of claim 31, characterized in that the tubular neck (567d) is situated in the center of the annular neck (567c) and in that the pot-shaped recess (566a) of the basic unit (559) is situated in a bottom face of the recess (566), characterized in that the pot-shaped recess (667i) of the interchangeable nozzle assembly (679) is located in the center of the annular neck (667c) and that the tubular neck (680c) of the basic unit (659) protrudes from a bottom face of the recess (666), characterized in that the bottom face of the recess (666) is formed on an insertion member (680) which can be fastened in the recess (666), preferably screwed into the recess, characterized in that the coupling sites for working medium and blast air assigned to a spray nozzle device (560; 660) can be designed as an integral element (567; 667) on the side of the interchangeable nozzle assembly (579; 679), characterized in that the spray nozzle device (560; 660; 760) comprises at least one fastening member (567; 667; 767) for being fastened on the spray nozzle support (568; 668; 768) and a nozzle tip (571; 671; 771) for generating the spraying jet, characterized in that the nozzle tip (571) is directly mounted on the fastening member (567), characterized in that the nozzle tip (671; 771) is mounted on the fastening member (667; 767) by way of an interposed extension unit (682; 782/785), characterized in that the nozzle tip (571; 771) is pivotably mounted on the fastening member (567), or the extension unit (781/785), respectively, characterized in that the nozzle tip (671) is mounted on the fastening member, or the extension unit (682), respectively, directionally stable, and characterized in that the fastening member (567; 667; 767) comprises a coupling element (574; 674; 774) for the coupling of a flexible tubular member (572; 672; 772) connecting the central opening (567e) for working medium of the fastening member with the nozzle tip (571; 671; 771), thus forming part of the working medium supply line.

33. Spraying device according to claim 32, characterized in that the coupling element (574; 674; 774) can be screwed into the fastening element (567; 667; 767), characterized in that the fastening member (567; 667; 767) comprises a cylindrical section (567g; 667g) protruding from the spray nozzle support (567; 667; 767) in a direction facing away from the basic unit, which cylindrical section follows the plurality of blast air supply line sections of the annular neck, characterized in that a substantially annular space (575; 675; 775) provided between the cylindrical section (567g; 667g) and the flexible tubular member (572; 672; 772) constitutes an additional section of the blast air supply line, characterized in that the nozzle tip (571; 771) can be fixedly disposed on the fastening member (567) or on the extension unit (782/785), by means of a union nut (577; 785e), characterized in that an adapter unit (785) for assembling a nozzle tip (771) is provided on an extension unit (782), and characterized in that the spray nozzle device (560; 660; 760) operates in accordance with the external mixing principle.

* * * * *

UNITED STATES PATENT AND TRADEMARK OFFICE
CERTIFICATE OF CORRECTION

PATENT NO.   : 5,785,252
DATED        : July 28, 1998
INVENTOR(S)  : Karl-Heinz Keim and Rudi Kober It is certified that error appears in the above-identified patent and that said Letters Patent is hereby corrected as shown below:

Column 1, line 42, "fro" should read -- from --;
Column 2, line 10, "predermined" should read -- predetermined --;
Column 6, line 36, "spefically" should read -- specifically --;
Column 7, line 59, "may" should read -- 4b -- and "4b" should read -- may --;
Column 9, line 54, "30a1" (second occurrence) should read -- 30a2 --;
Column 12, line 13, "a" should read -- $\alpha$ -- (alpha);
Column 15, line 13, "ruber" should read -- rubber --;
Column 15, line 33, "emodiment" should read -- embodiment --;
Column 16, line 28, "througout" should read -- throughout --;
Column 18, line 30, "suface" should read -- surface --;
Column 19, line 7, "throughput" should read -- throughout --;
Column 21, line 14, "throughly exlained" should read -- thoroughly explained --;
Column 21, line 25, "reces" should read -- recess --;
Column 21, line 49, "accomodate" should read -- accommodate --; and
Column 22, line 36, "accomodating" should read -- accommodating--.

Signed and Sealed this

Twenty-seventh Day of April, 1999

Attest:

Q. TODD DICKINSON

*Attesting Officer*   *Acting Commissioner of Patents and Trademarks*